United States Patent
Lakshman

(10) Patent No.: US 12,083,596 B2
(45) Date of Patent: Sep. 10, 2024

(54) THERMAL ELEMENTS FOR DISASSEMBLY OF NODE-BASED ADHESIVELY BONDED STRUCTURES

(71) Applicant: Divergent Technologies, Inc., Los Angeles, CA (US)

(72) Inventor: Narender Shankar Lakshman, Hermosa Beach, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 0 days.

(21) Appl. No.: 17/556,516

(22) Filed: Dec. 20, 2021

(65) Prior Publication Data
US 2022/0193777 A1    Jun. 23, 2022

Related U.S. Application Data

(60) Provisional application No. 63/128,665, filed on Dec. 21, 2020.

(51) Int. Cl.
*B22F 10/64*    (2021.01)
*B22F 7/06*    (2006.01)
(Continued)

(52) U.S. Cl.
CPC .............. *B22F 10/64* (2021.01); *B22F 7/06* (2013.01); *B22F 10/28* (2021.01); *B22F 10/62* (2021.01);
(Continued)

(58) Field of Classification Search
CPC .......... B22F 10/28; B22F 10/62; B22F 10/64; B22F 10/66; B22F 10/85; B22F 2202/11;
(Continued)

(56) References Cited

U.S. PATENT DOCUMENTS

| 5,203,226 A | 4/1993 | Hongou et al. |
| 5,742,385 A | 4/1998 | Champa |

(Continued)

FOREIGN PATENT DOCUMENTS

| EP | 0521825 B1 * | 8/1996 |
| WO | 1996036455 A1 | 11/1996 |

(Continued)

OTHER PUBLICATIONS

US 9,202,136 B2, 12/2015, Schmidt et al. (withdrawn)
(Continued)

*Primary Examiner* — Philip C Tucker
*Assistant Examiner* — Jimmy R Smith, Jr.
(74) *Attorney, Agent, or Firm* — ARENTFOX SCHIFF LLP

(57) ABSTRACT

Methods and apparatuses for disassembling components are described. An apparatus in accordance with an aspect of the present disclosure comprises a first component including a first adhesive interface, a second component including a second adhesive interface, a joint between the first and second adhesive interfaces, the joint comprising an adhesive bonding to the first adhesive interface and to the second adhesive interface, such that the first component and the second component are joined together, and at least one thermal element in the adhesive, wherein the at least one thermal element is configured to weaken the joint by heating the adhesive when an energy is applied to the thermal element.

7 Claims, 12 Drawing Sheets

(51) Int. Cl.
*B22F 10/28* (2021.01)
*B22F 10/62* (2021.01)
*B22F 10/85* (2021.01)
*B33Y 10/00* (2015.01)
*B33Y 40/20* (2020.01)
*B33Y 80/00* (2015.01)

(52) U.S. Cl.
CPC ............... *B33Y 40/20* (2020.01); *B33Y 80/00* (2014.12); *B22F 10/85* (2021.01); *B33Y 10/00* (2014.12)

(58) Field of Classification Search
CPC ........ B22F 2999/00; B22F 5/003; B22F 7/06; B33Y 10/00; B33Y 40/20; B33Y 80/00; B32B 2310/0825; B32B 43/006; B29B 2017/0213; C09J 2301/502
See application file for complete search history.

(56) References Cited

U.S. PATENT DOCUMENTS

| | | | |
|---|---|---|---|
| 5,990,444 | A | 11/1999 | Costin |
| 6,010,155 | A | 1/2000 | Rinehart |
| 6,096,249 | A | 8/2000 | Yamaguchi |
| 6,140,602 | A | 10/2000 | Costin |
| 6,250,533 | B1 | 6/2001 | Otterbein et al. |
| 6,252,196 | B1 | 6/2001 | Costin et al. |
| 6,318,642 | B1 | 11/2001 | Goenka et al. |
| 6,365,057 | B1 | 4/2002 | Whitehurst et al. |
| 6,391,251 | B1 | 5/2002 | Keicher et al. |
| 6,409,930 | B1 | 6/2002 | Whitehurst et al. |
| 6,468,439 | B1 | 10/2002 | Whitehurst et al. |
| 6,554,345 | B2 | 4/2003 | Jonsson |
| 6,585,151 | B1 | 7/2003 | Ghosh |
| 6,644,721 | B1 | 11/2003 | Miskech et al. |
| 6,811,744 | B2 | 11/2004 | Keicher et al. |
| 6,866,497 | B2 | 3/2005 | Saiki |
| 6,919,035 | B1 | 7/2005 | Clough |
| 6,926,970 | B2 | 8/2005 | James et al. |
| 7,152,292 | B2 | 12/2006 | Hohmann et al. |
| 7,344,186 | B1 | 3/2008 | Hausler et al. |
| 7,500,373 | B2 | 3/2009 | Quell |
| 7,586,062 | B2 | 9/2009 | Heberer |
| 7,637,134 | B2 | 12/2009 | Burzlaff et al. |
| 7,710,347 | B2 | 5/2010 | Gentilman et al. |
| 7,716,802 | B2 | 5/2010 | Stern et al. |
| 7,745,293 | B2 | 6/2010 | Yamazaki et al. |
| 7,766,123 | B2 | 8/2010 | Sakurai et al. |
| 7,852,388 | B2 | 12/2010 | Shimizu et al. |
| 7,908,922 | B2 | 3/2011 | Zarabadi et al. |
| 7,951,324 | B2 | 5/2011 | Naruse et al. |
| 8,094,036 | B2 | 1/2012 | Heberer |
| 8,163,077 | B2 | 4/2012 | Eron et al. |
| 8,286,236 | B2 | 10/2012 | Jung et al. |
| 8,289,352 | B2 | 10/2012 | Vartanian et al. |
| 8,297,096 | B2 | 10/2012 | Mizumura et al. |
| 8,354,170 | B1 | 1/2013 | Henry et al. |
| 8,383,028 | B2 | 2/2013 | Lyons |
| 8,408,036 | B2 | 4/2013 | Reith et al. |
| 8,429,754 | B2 | 4/2013 | Jung et al. |
| 8,437,513 | B1 | 5/2013 | Derakhshani et al. |
| 8,444,903 | B2 | 5/2013 | Lyons et al. |
| 8,452,073 | B2 | 5/2013 | Taminger et al. |
| 8,599,301 | B2 | 12/2013 | Dowski, Jr. et al. |
| 8,606,540 | B2 | 12/2013 | Haisty et al. |
| 8,610,761 | B2 | 12/2013 | Haisty et al. |
| 8,631,996 | B2 | 1/2014 | Quell et al. |
| 8,675,925 | B2 | 3/2014 | Derakhshani et al. |
| 8,678,060 | B2 | 3/2014 | Dietz et al. |
| 8,686,314 | B2 | 4/2014 | Schneegans et al. |
| 8,686,997 | B2 | 4/2014 | Radet et al. |
| 8,694,284 | B2 | 4/2014 | Berard |
| 8,720,876 | B2 | 5/2014 | Reith et al. |
| 8,752,166 | B2 | 6/2014 | Jung et al. |
| 8,755,923 | B2 | 6/2014 | Farahani et al. |
| 8,787,628 | B1 | 7/2014 | Derakhshani et al. |
| 8,818,771 | B2 | 8/2014 | Gielis et al. |
| 8,873,238 | B2 | 10/2014 | Wilkins |
| 8,978,535 | B2 | 3/2015 | Ortiz et al. |
| 9,006,605 | B2 | 4/2015 | Schneegans et al. |
| 9,071,436 | B2 | 6/2015 | Jung et al. |
| 9,101,979 | B2 | 8/2015 | Hofmann et al. |
| 9,104,921 | B2 | 8/2015 | Derakhshani et al. |
| 9,126,365 | B1 | 9/2015 | Mark et al. |
| 9,128,476 | B2 | 9/2015 | Jung et al. |
| 9,138,924 | B2 | 9/2015 | Yen |
| 9,149,988 | B2 | 10/2015 | Mark et al. |
| 9,156,205 | B2 | 10/2015 | Mark et al. |
| 9,186,848 | B2 | 11/2015 | Mark et al. |
| 9,244,986 | B2 | 1/2016 | Karmarkar |
| 9,248,611 | B2 | 2/2016 | Divine et al. |
| 9,254,535 | B2 | 2/2016 | Buller et al. |
| 9,266,566 | B2 | 2/2016 | Kim |
| 9,269,022 | B2 | 2/2016 | Rhoads et al. |
| 9,327,452 | B2 | 5/2016 | Mark et al. |
| 9,329,020 | B1 | 5/2016 | Napoletano |
| 9,332,251 | B2 | 5/2016 | Haisty et al. |
| 9,346,127 | B2 | 5/2016 | Buller et al. |
| 9,389,315 | B2 | 7/2016 | Bruder et al. |
| 9,399,256 | B2 | 7/2016 | Buller et al. |
| 9,403,235 | B2 | 8/2016 | Buller et al. |
| 9,418,193 | B2 | 8/2016 | Dowski, Jr. et al. |
| 9,457,514 | B2 | 10/2016 | Schwärzler |
| 9,469,057 | B2 | 10/2016 | Johnson et al. |
| 9,478,063 | B2 | 10/2016 | Rhoads et al. |
| 9,481,402 | B1 | 11/2016 | Muto et al. |
| 9,486,878 | B2 | 11/2016 | Buller et al. |
| 9,486,960 | B2 | 11/2016 | Paschkewitz et al. |
| 9,502,993 | B2 | 11/2016 | Deng |
| 9,525,262 | B2 | 12/2016 | Stuart et al. |
| 9,533,526 | B1 | 1/2017 | Nevins |
| 9,555,315 | B2 | 1/2017 | Aders |
| 9,555,580 | B1 | 1/2017 | Dykstra et al. |
| 9,557,856 | B2 | 1/2017 | Send et al. |
| 9,566,742 | B2 | 2/2017 | Keating et al. |
| 9,566,758 | B2 | 2/2017 | Cheung et al. |
| 9,573,193 | B2 | 2/2017 | Buller et al. |
| 9,573,225 | B2 | 2/2017 | Buller et al. |
| 9,586,290 | B2 | 3/2017 | Buller et al. |
| 9,595,795 | B2 | 3/2017 | Lane et al. |
| 9,597,843 | B2 | 3/2017 | Stauffer et al. |
| 9,600,929 | B1 | 3/2017 | Young et al. |
| 9,609,755 | B2 | 3/2017 | Coull et al. |
| 9,610,737 | B2 | 4/2017 | Johnson et al. |
| 9,611,667 | B2 | 4/2017 | GangaRao et al. |
| 9,616,623 | B2 | 4/2017 | Johnson et al. |
| 9,626,487 | B2 | 4/2017 | Jung et al. |
| 9,626,489 | B2 | 4/2017 | Nilsson |
| 9,643,361 | B2 | 5/2017 | Liu |
| 9,662,840 | B1 | 5/2017 | Buller et al. |
| 9,665,182 | B2 | 5/2017 | Send et al. |
| 9,672,389 | B1 | 6/2017 | Mosterman et al. |
| 9,672,550 | B2 | 6/2017 | Apsley et al. |
| 9,676,145 | B2 | 6/2017 | Buller et al. |
| 9,684,919 | B2 | 6/2017 | Apsley et al. |
| 9,688,032 | B2 | 6/2017 | Kia et al. |
| 9,690,286 | B2 | 6/2017 | Hovsepian et al. |
| 9,700,966 | B2 | 7/2017 | Kraft et al. |
| 9,703,896 | B2 | 7/2017 | Zhang et al. |
| 9,713,903 | B2 | 7/2017 | Paschkewitz et al. |
| 9,718,302 | B2 | 8/2017 | Young et al. |
| 9,718,434 | B2 | 8/2017 | Hector, Jr. et al. |
| 9,724,877 | B2 | 8/2017 | Flitsch et al. |
| 9,724,881 | B2 | 8/2017 | Johnson et al. |
| 9,725,178 | B2 | 8/2017 | Wang |
| 9,731,730 | B2 | 8/2017 | Stiles |
| 9,731,773 | B2 | 8/2017 | Gami et al. |
| 9,741,954 | B2 | 8/2017 | Bruder et al. |
| 9,747,352 | B2 | 8/2017 | Karmarkar |
| 9,764,415 | B2 | 9/2017 | Seufzer et al. |
| 9,764,520 | B2 | 9/2017 | Johnson et al. |
| 9,765,226 | B2 | 9/2017 | Dain |
| 9,770,760 | B2 | 9/2017 | Liu |

(56) References Cited

U.S. PATENT DOCUMENTS

| | | |
|---|---|---|
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |

(56) References Cited

U.S. PATENT DOCUMENTS

| | | |
|---|---|---|
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2006/0108783 A1 | 5/2006 | Ni et al. |
| 2009/0056865 A1 | 3/2009 | Kubota et al. |
| 2014/0277669 A1 | 9/2014 | Nardi et al. |
| 2017/0113344 A1 | 4/2017 | Schönberg |
| 2017/0341309 A1 | 11/2017 | Piepenbrock et al. |
| 2018/0319084 A1 | 11/2018 | Torrealba et al. |
| 2020/0147684 A1* | 5/2020 | Bowden, Jr. ........... B33Y 10/00 |

FOREIGN PATENT DOCUMENTS

| | | |
|---|---|---|
| WO | 1996036525 A1 | 11/1996 |
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2016164729 A1 | 10/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
Machine translation of EP-0521825-B1, Burkart, Aug. 1996.*
International Search Report and the Written Opinion issued for corresponding International Application No. PCT/US21/64708, Mar. 16, 2022.

* cited by examiner

THERMAL ELEMENTS FOR DISASSEMBLY OF NODE-BASED ADHESIVELY BONDED STRUCTURES

CROSS-REFERENCE TO RELATED APPLICATIONS

The present disclosure claims the benefit under 35 U.S.C. 119 of U.S. Provisional Patent Application No. 63/128,665, filed Dec. 21, 2020 and entitled "THERMAL ELEMENTS FOR DISASSEMBLY OF NODE-BASED ADHESIVELY BONDED STRUCTURES", which application is incorporated by reference herein in its entirety.

BACKGROUND

Field

The present disclosure relates generally to adhesively bonded structures, and more specifically to disassembly of adhesively bonded structures.

Description of the Related Art

Three-dimensional (3-D) printing, also referred to as additive manufacturing (AM), has recently presented new opportunities to more efficiently build complex transport structures, such as automobiles, aircraft, boats, motorcycles, busses, trains, and the like. AM techniques are capable of fabricating complex components from a wide variety of materials. Applying AM processes to industries that produce these products has proven to produce a structurally more efficient transport structure. For example, an automobile produced using 3-D printed components can be made stronger, lighter, and consequently, more fuel efficient. Moreover, AM enables manufacturers to 3-D print components that are much more complex and that are equipped with more advanced features and capabilities than components made via traditional machining and casting techniques.

Despite these recent advances, a number of obstacles remain with respect to the practical implementation of AM techniques in transport structures and other assemblies.

SUMMARY

The present disclosure is generally directed to techniques for disassembling adhesively-bonded structures.

An apparatus in accordance with an aspect of the present disclosure comprises a first component including a first adhesive interface, a second component including a second adhesive interface, a joint between the first and second adhesive interfaces, the joint comprising an adhesive bonding to the first adhesive interface and to the second adhesive interface, such that the first component and the second component are joined together, and at least one thermal element in the adhesive, wherein the at least one thermal element is configured to weaken the joint by heating the adhesive when an energy is applied to the thermal element.

Such an apparatus further optionally includes the energy comprising at least a thermal energy or an electrical energy, the at least one thermal element being a plurality of thermal elements, the first adhesive interface comprising a tongue, and the second adhesive interface comprising a groove, the groove of the first component comprising a plurality of sections, and wherein at least one thermal element in the plurality of thermal elements is in a section in the plurality of sections of the groove of the first component, at least one section in the plurality of sections of the groove of the first component containing a plurality of thermal elements, a retention feature configured to hold the first and second components together during a curing of the adhesive, wherein the retention feature provides at least one pathway to access the at least one thermal element, the retention feature comprising a plurality of pathways, wherein each thermal element in the plurality of thermal elements is accessed through one of the pathways in the plurality of pathways each thermal element in the plurality of thermal elements being coupled to a different pathway in the plurality of pathways, and the at least one thermal element includes a wire.

Such an apparatus further optionally includes the first feature comprising a tongue structure and the second feature comprising a groove structure, such that the tongue structure is configured to mate with the groove structure, the first component being additively-manufactured using direct energy deposition, the second component being additively-manufactured using powder bed fusion, the second surface profile being generated by a three-dimensional scan, a model being generated from the first surface profile, the second surface profile being generated by a computer-aided design model, the second surface profile being additively-manufactured to include an offset from the first surface profile, the offset being configured to allow an adhesive to be applied within the offset, and may further comprise an adhesive, coupled between the first surface profile and the second surface profile.

A method for disassembling a part, the part comprising a first component, a second component, and a joint comprising an adhesive joining the first and second components together, in accordance with an aspect of the present disclosure comprises applying an energy to at least one thermal element in the adhesive, the at least one thermal element being configured to weaken the joint by heating the adhesive when the energy is applied to the thermal element, and applying a force to at least the first component or the second component to disassemble the part.

Such a method further optionally includes applying a thermal energy or applying an electrical energy, the at least one thermal element is a plurality of thermal elements, and applying the energy further comprises applying the energy to each of the thermal elements in the plurality of thermal elements, placing a first thermal element in a first section of the joint and placing a second thermal element in a second section of the joint, placing a plurality of thermal elements in at least one section of the joint, and accessing the at least one thermal element through a retention feature.

It will be understood that other aspects of joining components will become readily apparent to those skilled in the art from the following detailed description, wherein it is shown and described only several embodiments by way of illustration. As will be appreciated by those skilled in the art, the joining of additively manufactured components can be realized with other embodiments without departing from the scope of the present disclosure. Accordingly, the drawings and detailed description are to be regarded as illustrative in nature and not as restrictive.

BRIEF DESCRIPTION OF THE DRAWINGS

Various aspects of using a high-throughput, lower precision additive manufacturing process to produce large components in conjunction with a higher precision, lower throughput additive manufacturing process and the formation of a structural joint between the two components will now be presented in the detailed description by way of example, and not by way of limitation, in the accompanying drawings, wherein.

DETAILED DESCRIPTION

Figure 1A:
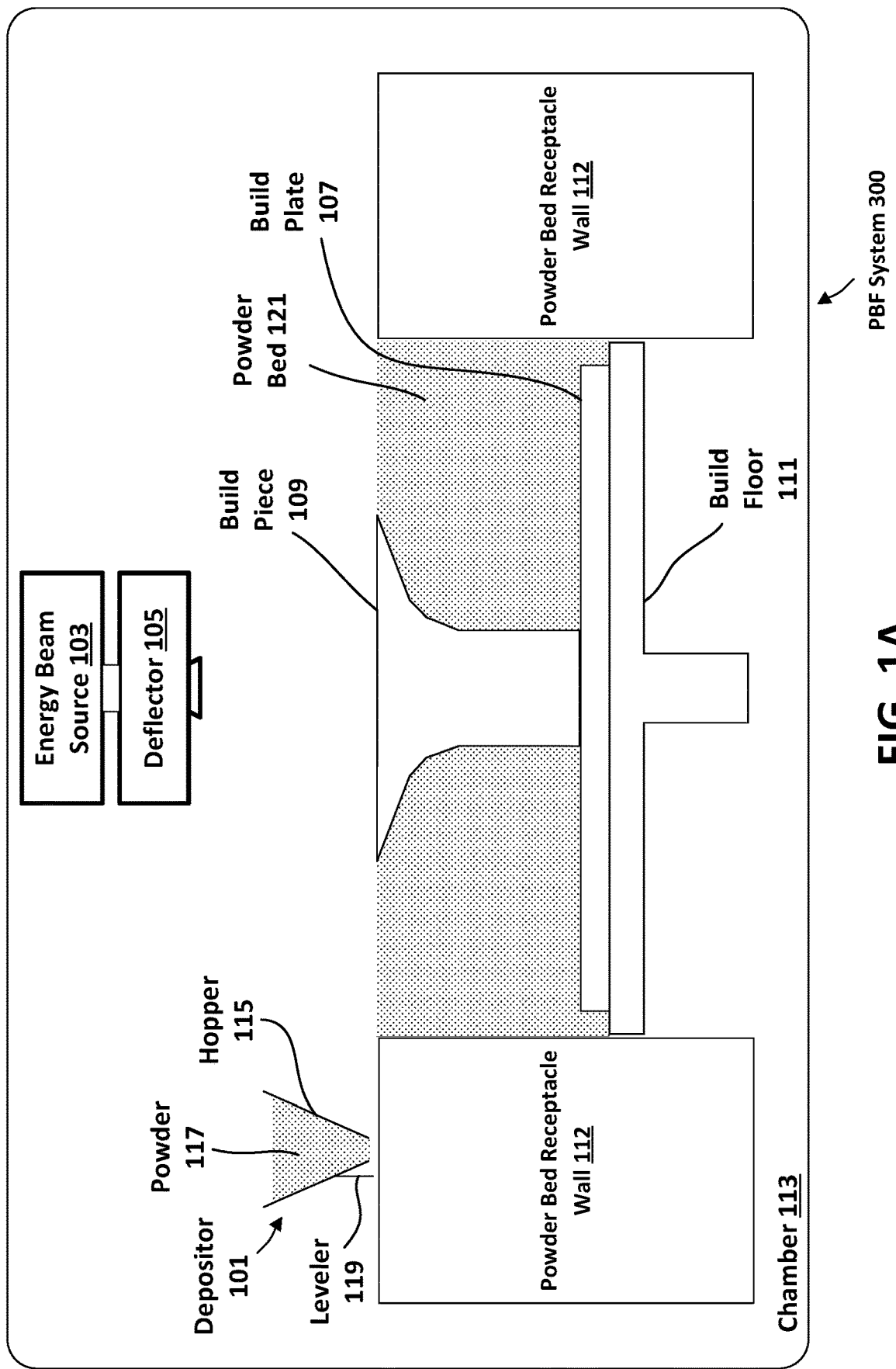
FIGS. 1A-1D illustrate respective side views of an exemplary PBF system during different stages of operation in accordance with an aspect of the present disclosure.

The detailed description set forth below in connection with the drawings is intended to provide a description of exemplary embodiments of joining additively manufactured nodes and subcomponents, and it is not intended to represent the only embodiments in which the disclosure may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the disclosure to those skilled in the art. However, the disclosure may be practiced without these specific details. In some instances, well-known structures and components may be shown in block diagram form, or omitted entirely, in order to avoid obscuring the various concepts presented throughout this disclosure.

Additive Manufacturing

Additive Manufacturing (AM) involves the use of a stored geometrical model for accumulating layered materials on a build plate to produce a three-dimensional (3-D) build piece having features defined by the model. AM techniques are capable of printing complex components using a wide variety of materials. A 3-D object may be fabricated based on a computer aided design (CAD) model. The CAD model can be used to generate a set of instructions or commands that are compatible with a particular 3-D printer. The AM process can create a solid three-dimensional object using the CAD model and print instructions. In the AM process, different materials or combinations of material, such as engineered plastics, thermoplastic elastomers, metals, ceramics, and/or alloys or combinations of the above, etc., may be used to create a uniquely shaped 3-dimensional object.

The use of AM in the context of joining two or more components may provide significant flexibility and cost saving benefits. These, and other benefits may enable manufacturers of mechanical structures to produce components at a lower cost and/or in a more efficient manner. The joining techniques described in the present disclosure relate to a process for connecting AM components and/or commercial off the shelf (COTS) components. AM components are 3-D components that are printed by, for example, adding layer upon layer of one or more materials based on a preprogramed design. The components described herein may be components used to assemble a variety of devices, such as engine components, structural components, etc. Further, such AM or COTS components may be used in assemblies, such as vehicles, trucks, trains, motorcycles, boats, aircraft, and the like, or other mechanized assemblies, without departing from the scope of the present disclosure.

Components and Terminology in AM

In an aspect of the present disclosure, a component is an example of an AM component. A component may be any 3-D printed component that includes features, such as an interface, for mating with another component. The component may have internal or external features configured to accept a particular type of component. Alternatively or additionally, the component may be shaped to accept a particular type of component. A component may utilize any internal design or shape and accept any variety of components without departing from the scope of the disclosure.

A number of different AM technologies may be well-suited for construction of components in a transport structure or other mechanized assembly. Such 3-D printing techniques may include, for example, directed energy deposition (DED), selective laser melting (SLM), selective laser sintering (SLS), direct metal laser sintering (DMLS), electron beam melting (EBM), powder bed fusion (PBF), and/or other AM processes involving melting or fusion of metallic powders.

As in many 3-D printing techniques, these processes (e.g., PBF systems) can create build pieces layer-by-layer. Each layer or "slice" is formed by depositing a layer of powder and exposing portions of the powder to an energy beam. The energy beam is applied to melt areas of the powder layer that coincide with the cross-section of the build piece in the layer. The melted powder cools and fuses to form a slice of the build piece. The process can be repeated to form the next slice of the build piece, and so on. Each layer is deposited on top of the previous layer. The resulting structure is a build piece assembled slice-by-slice from the ground up. SLS and various other PBF techniques may be well suited to construction of gear cases and other transport structure components. However, it will be appreciated that other AM techniques, such as fused deposition modeling (FDM) and the like, are also possible for use in such applications.

Directed energy deposition (DED) is an example of an AM process. DED is an AM technology primarily used to create structures from metals and alloys. This technique is used for both creating 3-D structures and for repairing existing structures. DED can be used for directly depositing material onto existing AM components. DED deposits material via a powder depositor or a wire feedstock.

One advantage of DED is that the technology can also be used to create build pieces including chunks of a single metal or alloy material directly on surfaces of other components. These uniform build pieces may have various uses in a vehicle, for example, where solid metal components are desired such as impact structures in a vehicle. The structural composition of current DED systems can vary. For example, in some DED systems, the material depositor is structurally separate from the energy source. In other DED systems, the material depositor and energy source are part of the same apparatus. However, an artifact of DED components are striations resulting from the deposition of material during the additive manufacturing process. Accordingly, removal of material upon completion of the 3-D print is desired for these components. The post-processing removal of striations can be a laborious and time-consuming process that introduces substantial inefficiencies into the overall manufacturing process. Manufacturers typically rely on labor-intensive and expensive techniques such as machining to complete the manufacturing process to achieve the desired final product for the 3-D printed component. Machining may result in a smoother surface finish of the component having the striations.

A tongue-and-groove (TNG) structure may be used to connect two or more components at an interface. For example, a tongue portion of one component may extend all the way around a peripheral region as a single protrusion disposed around the peripheral region. The tongue portion of a component may protrude outward along the peripheral region relative to that component, and the lateral extension of the tongue portion can be considered in this view as "coming out" of that component.

A groove portion of an interface is a portion of a second component and may be disposed along a peripheral region of the second component. The groove portion may, but need not, comprise the material of the second component. The groove portion may extend all the way around the peripheral region and may be a single channel in the second component. The groove portion may also be inset inward along the peripheral region relative to the second component and runs laterally around the second component. The tongue and groove may be arranged on the first and second components such that when the two components are placed into contact, the tongue may align with the groove and may fit into the groove around the peripheral regions at the interface between the two components. In an aspect of the present disclosure, a tongue and/or a groove may include centering features which enable the tongue to be centered in the groove.

While the above description relates primarily to using a tongue-and-groove structure to join two or more components, the techniques described in this disclosure are not only applicable to tongue-and-groove structures. In fact, any suitable technique for joining multiple structures may be used without departing from the scope of the disclosure.

Additive Manufacturing Environment

FIGS. 1A-1D illustrate respective side views of a 3-D printer system in an aspect of the present disclosure.

In an aspect of the present disclosure, a 3-D printer system may be a powder-bed fusion (PBF) system 100. FIGS. 1A-D show PBF system 100 during different stages of operation. The particular embodiment illustrated in FIGS. 1A-1D is one of many suitable examples of a PBF system employing principles of this disclosure. It should also be noted that elements of FIGS. 1A-1D and the other figures in this disclosure are not necessarily drawn to scale, but may be drawn larger or smaller for the purpose of better illustration of concepts described herein. PBF system 100 can include a depositor 101 that can deposit each layer of metal powder, an energy beam source 103 that can generate an energy beam, a deflector 105 that can apply the energy beam to fuse the powder material, and a build plate 107 that can support one or more build pieces, such as a build piece 109. Although the terms "fuse" and/or "fusing" are used to describe the mechanical coupling of the powder particles, other mechanical actions, e.g., sintering, melting, and/or other electrical, mechanical, electromechanical, electrochemical, and/or chemical coupling methods are envisioned as being within the scope of the present disclosure.

PBF system 100 can also include a build floor 111 positioned within a powder bed receptacle. The walls of the powder bed receptacle 112 generally define the boundaries of the powder bed receptacle, which is sandwiched between the walls 112 from the side and abuts a portion of the build floor 111 below. Build floor 111 can progressively lower build plate 107 so that depositor 101 can deposit a next layer. The entire mechanism may reside in a chamber 113 that can enclose the other components, thereby protecting the equipment, enabling atmospheric and temperature regulation and mitigating contamination risks. Depositor 101 can include a hopper 115 that contains a powder 117, such as a metal powder, and a leveler 119 that can level the top of each layer of deposited powder.

Referring specifically to FIG. 1A, this figure shows PBF system 100 after a slice of build piece 109 has been fused, but before the next layer of powder has been deposited. In fact, FIG. 1A illustrates a time at which PBF system 100 has already deposited and fused slices in multiple layers, e.g., 200 individual layers, to form the current state of build piece 109, e.g., formed of 200 individual slices. The multiple individual layers already deposited have created a powder bed 121, which includes powder that was deposited but not fused.

Figure 1B:
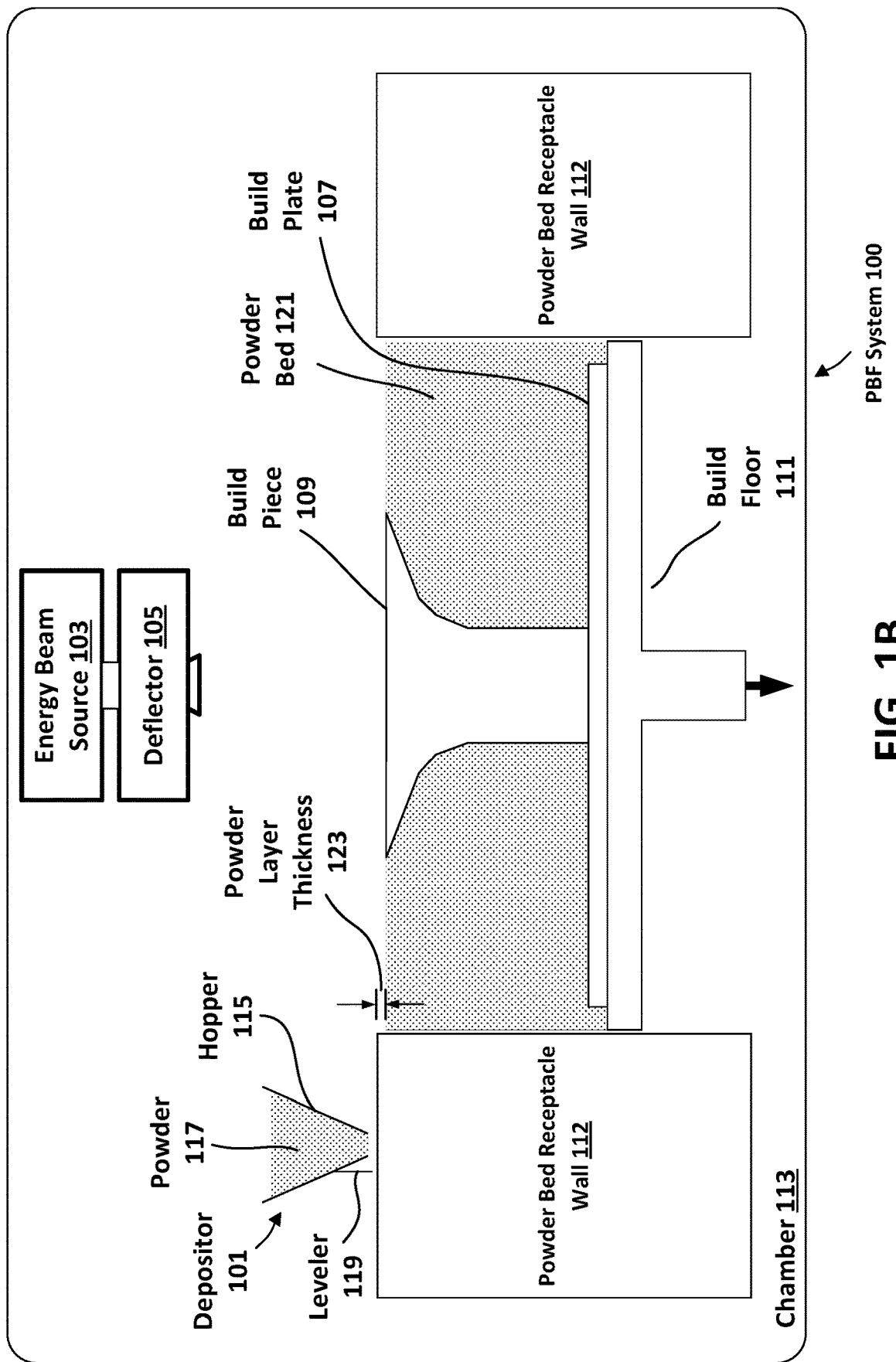

FIG. 1B shows PBF system 100 at a stage in which build floor 111 can lower by a powder layer thickness 123. The lowering of build floor 111 causes build piece 109 and powder bed 121 to drop by powder layer thickness 123, so that the top of build piece 109 and powder bed 121 are lower than the top of powder bed receptacle wall 112 by an amount equal to the powder layer thickness 123. In this way, for example, a space with a consistent thickness equal to powder layer thickness 123 can be created over the tops of build piece 109 and powder bed 121.

Figure 1C:
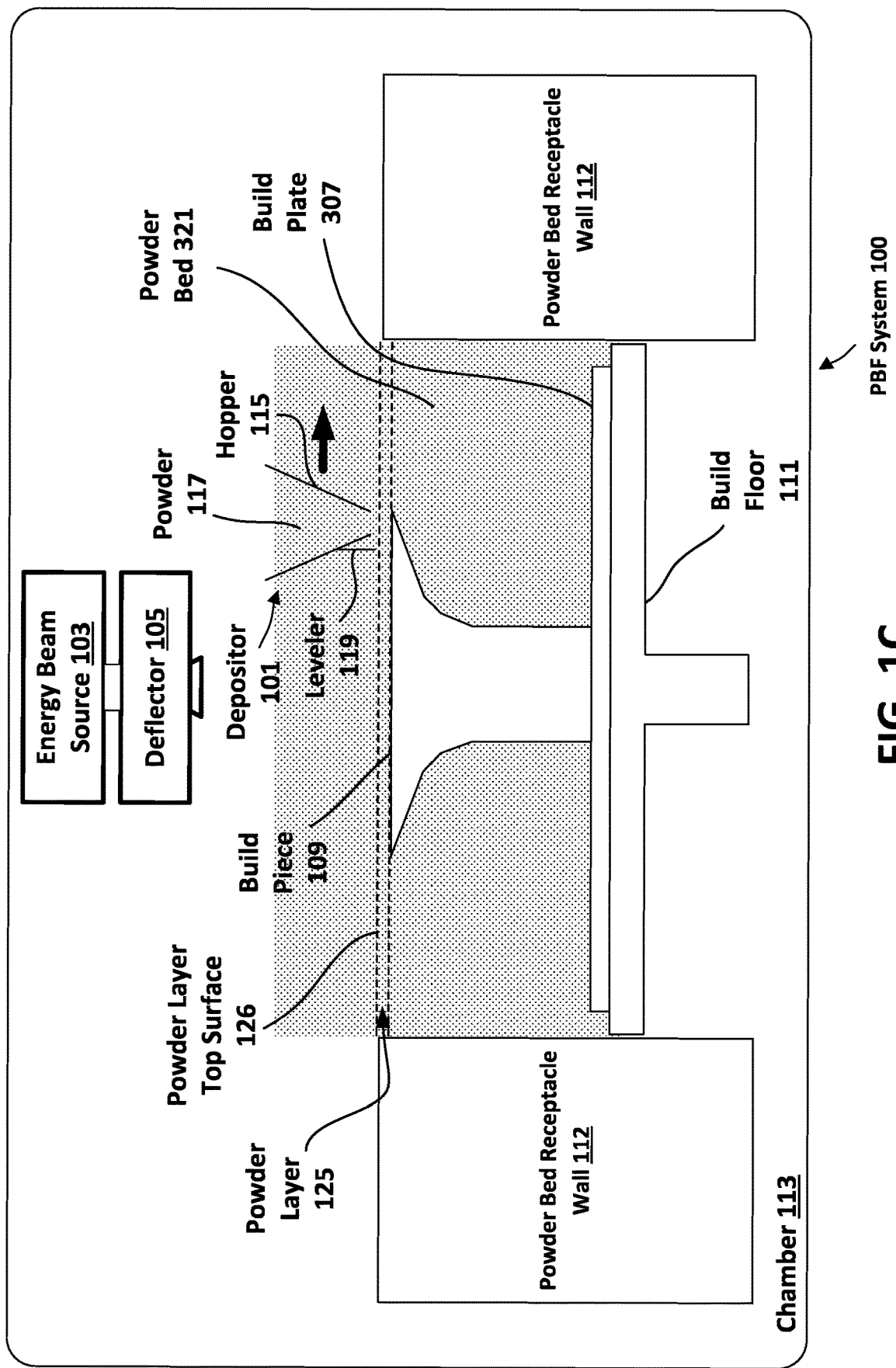

FIG. 1C shows PBF system 100 at a stage in which depositor 101 is positioned to deposit powder 117 in a space created over the top surfaces of build piece 109 and powder bed 121 and bounded by powder bed receptacle walls 112. In this example, depositor 101 progressively moves over the defined space while releasing powder 117 from hopper 115. Leveler 119 can level the released powder to form a powder layer 125 that leaves powder layer top surface 126 configured to receive fusing energy from energy beam source 103. Powder layer 125 has a thickness substantially equal to the powder layer thickness 123 (see FIG. 1). Thus, the powder in a PBF system can be supported by a powder material support structure, which can include, for example, a build plate 107, a build floor 111, a build piece 109, walls 112, and the like. It should be noted that the illustrated thickness of powder layer 125 (i.e., powder layer thickness 123 (FIG. 1B)) is greater than an actual thickness used for the example involving the 200 previously-deposited individual layers discussed above with reference to FIG. 1A.

Figure 1D:
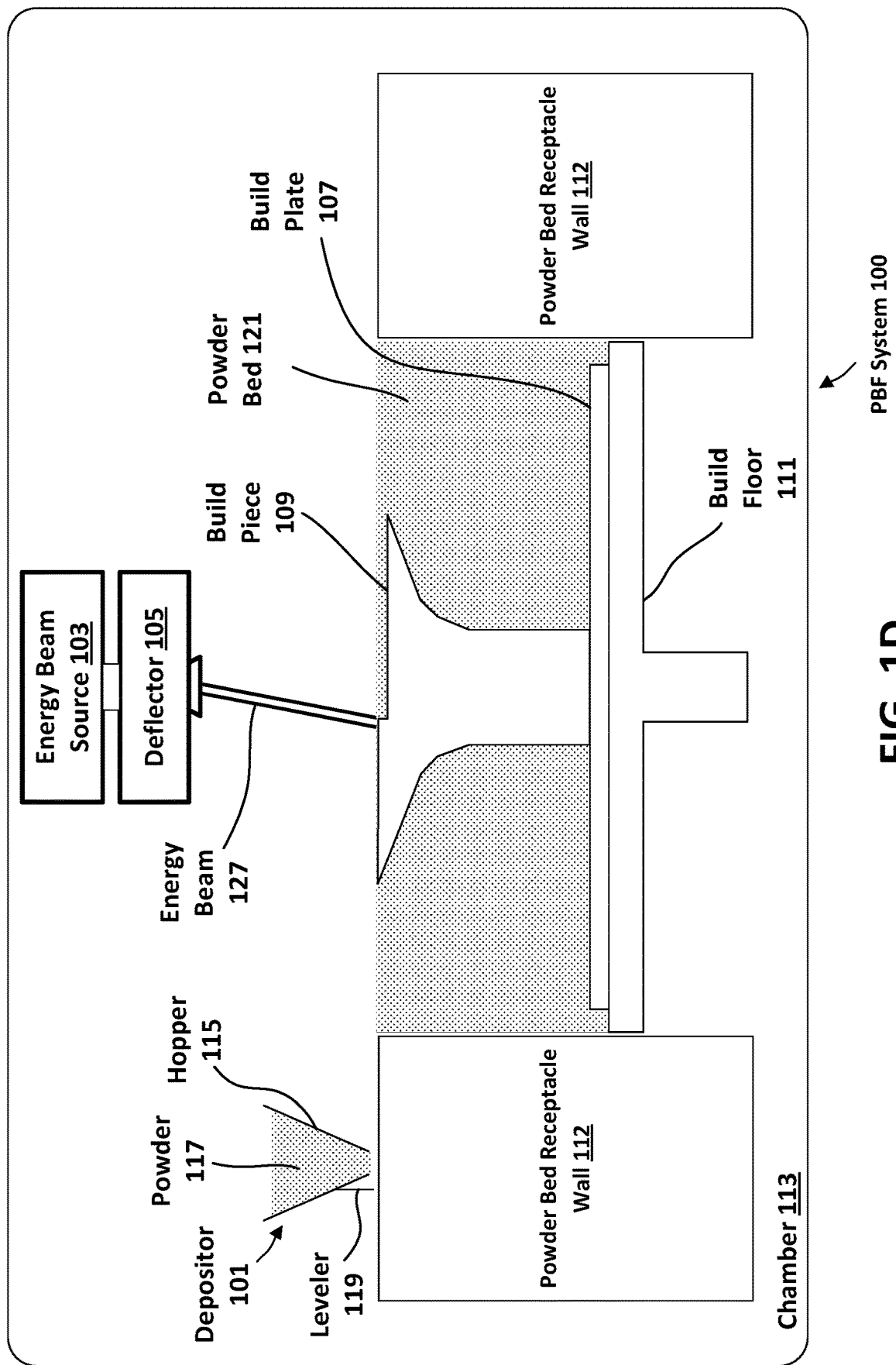

FIG. 1D shows PBF system 100 at a stage in which, following the deposition of powder layer 125 (FIG. 1C), energy beam source 103 generates an energy beam 127 and deflector 105 applies the energy beam to fuse the next slice in build piece 109. In various exemplary embodiments, energy beam source 103 can be an electron beam source, in which case energy beam 127 constitutes an electron beam.

Deflector 105 can include deflection plates that can generate an electric field or a magnetic field that selectively deflects the electron beam to cause the electron beam to scan across areas designated to be fused. In various embodiments, energy beam source 103 can be a laser, in which case energy beam 127 is a laser beam. Deflector 105 can include an optical system that uses reflection and/or refraction to manipulate the laser beam to scan selected areas to be fused.

In various embodiments, the deflector 105 can include one or more gimbals and actuators that can rotate and/or translate the energy beam source to position the energy beam. In various embodiments, energy beam source 103 and/or deflector 105 can modulate the energy beam, e.g., turn the energy beam on and off as the deflector scans so that the energy beam is applied only in the appropriate areas of the powder layer. For example, in various embodiments, the energy beam can be modulated by a digital signal processor (DSP).

Figure 1E:
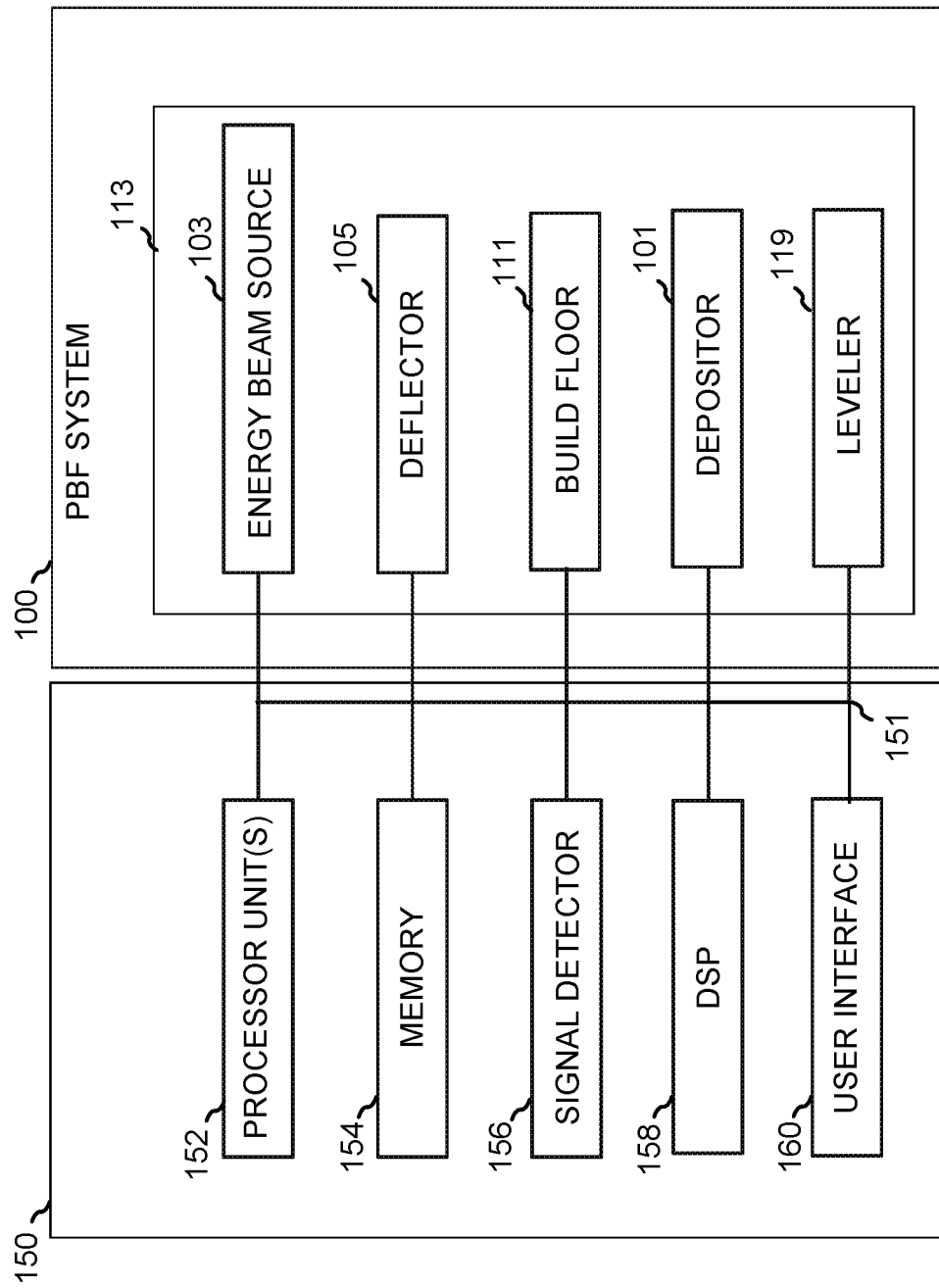
FIG. 1E illustrates a functional block diagram of a 3-D printer system in accordance with an aspect of the present disclosure.

FIG. 1E illustrates a functional block diagram of a 3-D printer system in accordance with an aspect of the present disclosure.

In an aspect of the present disclosure, control devices and/or elements, including computer software, may be coupled to PBF system 100 to control one or more components within PBF system 100. Such a device may be a computer 150, which may include one or more components that may assist in the control of PBF system 100. Computer 150 may communicate with a PBF system 100, and/or other AM systems, via one or more interfaces 151. The computer 150 and/or interface 151 are examples of devices that may be configured to implement the various methods described herein, that may assist in controlling PBF system 100 and/or other AM systems.

In an aspect of the present disclosure, computer 150 may comprise at least one processor unit 152, memory 154, signal detector 156, a digital signal processor (DSP) 158, and one or more user interfaces 160. Computer 150 may include additional components without departing from the scope of the present disclosure.

The computer 150 may include at least one processor unit 152, which may assist in the control and/or operation of PBF system 100. The processor unit 152 may also be referred to as a central processing unit (CPU). Memory 154, which may include both read-only memory (ROM) and random access memory (RAM), may provide instructions and/or data to the processor 304. A portion of the memory 154 may also include non-volatile random access memory (NVRAM). The processor 152 typically performs logical and arithmetic operations based on program instructions stored within the memory 154. The instructions in the memory 154 may be executable (by the processor unit 152, for example) to implement the methods described herein.

The processor unit 152 may comprise or be a component of a processing system implemented with one or more processors. The one or more processors may be implemented with any combination of general-purpose microprocessors, microcontrollers, digital signal processors (DSPs), floating point gate arrays (FPGAs), programmable logic devices (PLDs), controllers, state machines, gated logic, discrete hardware components, dedicated hardware finite state machines, or any other suitable entities that can perform calculations or other manipulations of information.

The processor unit 152 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, RS-274 instructions (G-code), numerical control (NC) programming language, and/or any other suitable format of code). The instructions, when executed by the one or more processors, cause the processing system to perform the various functions described herein.

The computer 150 may also include a signal detector 156 that may be used to detect and quantify any level of signals received by the computer 150 for use by the processing unit 152 and/or other components of the computer 150. The signal detector 156 may detect such signals as energy beam source 103 power, deflector 105 position, build floor 111 height, amount of powder 117 remaining in depositor 101, leveler 119 position, and other signals. Signal detector 156, in addition to or instead of processor unit 152 may also control other components as described with respect to the present disclosure. The computer 150 may also include a DSP 158 for use in processing signals received by the computer 150. The DSP 158 may be configured to generate instructions and/or packets of instructions for transmission to PBF system 100.

The computer 150 may further comprise a user interface 160 in some aspects. The user interface 160 may comprise a keypad, a pointing device, and/or a display. The user interface 160 may include any element or component that conveys information to a user of the computer 150 and/or receives input from the user.

The various components of the computer 150 may be coupled together by a bus system 151. The bus system 151 may include a data bus, for example, as well as a power bus, a control signal bus, and a status signal bus in addition to the data bus. Components of the computer 150 may be coupled together or accept or provide inputs to each other using some other mechanism.

Although a number of separate components are illustrated in FIG. 1E, one or more of the components may be combined or commonly implemented. For example, the processor unit 152 may be used to implement not only the functionality described above with respect to the processor unit 152, but also to implement the functionality described above with respect to the signal detector 156, the DSP 158, and/or the user interface 160. Further, each of the components illustrated in FIG. 1E may be implemented using a plurality of separate elements.

By way of example, an element, or any portion of an element, or any combination of elements may be implemented using one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors may execute software as that term is described above.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, compact disc (CD) ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), floppy disk and Blu-ray disc where disks usually reproduce data magnetically, while discs reproduce data optically with lasers. Thus, computer readable medium comprises a non-transitory computer readable medium (e.g., tangible media).

Robotic Assembly Environment

Figure 2:
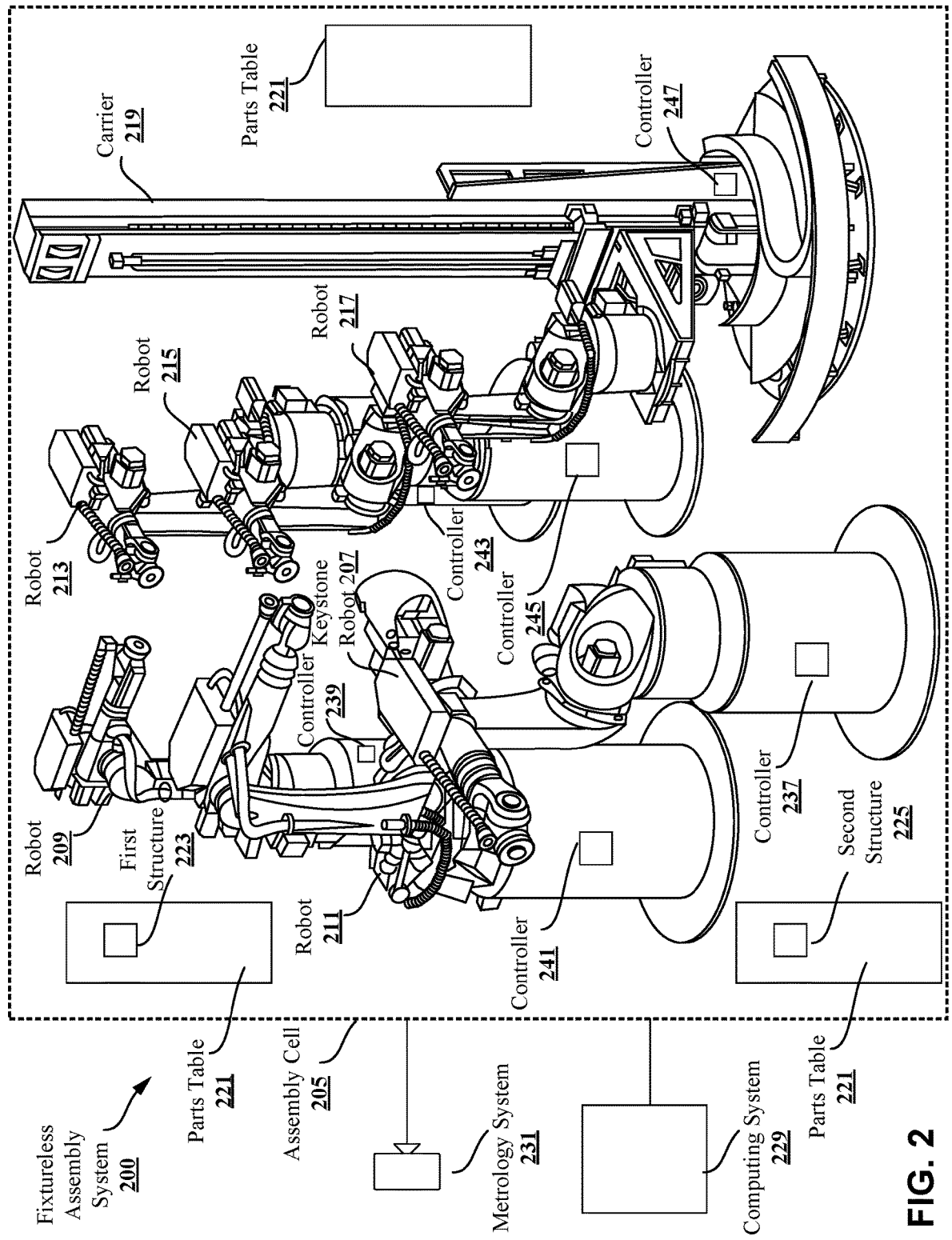
FIG. 2 illustrates a perspective view of an example of a fixtureless assembly system in accordance with an aspect of the present disclosure.

FIG. 2 illustrates a perspective view of an example of a fixtureless assembly system 200. Fixtureless assembly system 200 may be employed in various operations associated with fixtureless assembly of a vehicle, such as robotic assembly of a node-based vehicle. Fixtureless assembly system 200 may include one or more elements associated with at least a portion of the assembly of a vehicle without any fixtures. For example, one or more elements of fixtureless assembly system 200 may be configured for one or more operations in which a first structure is joined with one or more other structures without the use of any fixtures during robotic assembly of a node-based vehicle.

An assembly cell 205 may be configured at the location of fixtureless assembly system 200. Assembly cell 205 may be a vertical assembly cell. Within assembly cell 205, fixtureless assembly system 200 may include a set of robots 207, 209, 211, 213, 215, 217. Robot 207 may be referred to as a keystone robot. Fixtureless assembly system 200 may include parts tables 221 that can hold parts and structures for the robots to access. For example, a first structure 223 and a second structure 225 may be positioned on one of parts tables 221 to be picked up by the robots and assembled together. In various embodiments, one or more of the structures can be an additively manufactured structure, such as a complex node.

Fixtureless assembly system 200 may also include a computing system 229 to issue commands to the various controllers of the robots of assembly cell 205. In this example, computing system 229 is communicatively connected to the robots through wireless communication. Fixtureless assembly system 200 may also include a metrology system 231 that can accurately measure the positions of the robotic arms of the robots and/or the structures held by the robots.

In contrast to conventional robotic assembly factories, structures can be assembled without fixtures in fixtureless assembly system 200. For example, structures need not be connected within any fixtures, such as the fixtures described above. Instead, at least one of the robots in assembly cell 205 may provide the functionality expected from fixtures. For example, robots may be configured to directly contact (e.g., using an end effector of a robotic arm) structures to be assembled within assembly cell 205 so that those structures may be engaged and retained without any fixtures. Further, at least one of the robots may provide the functionality expected from the positioner and/or fixture table. For example, keystone robot 207 may replace a positioner and/or fixture table in fixtureless assembly system 200.

Keystone robot 207 may include a base and a robotic arm. The robotic arm may be configured for movement, which may be directed by computer-executable instructions loaded into a processor communicatively connected with keystone robot 207. Keystone robot 207 may contact a surface of assembly cell 205 (e.g., a floor of the assembly cell) through the base.

Keystone robot 207 may include and/or be connected with an end effector that is configured to engage and retain a first structure, e.g., a portion of a vehicle. An end effector may be a component configured to interface with at least one structure. Examples of the end effectors may include jaws, grippers, pins, or other similar components capable of facilitating fixtureless engagement and retention of a structure by a robot. In some embodiments, the first structure may be a section of a vehicle chassis, body, frame, panel, base piece, and the like. For example, the first structure may comprise a floor panel.

In some embodiments, keystone robot 207 may retain the connection with a first structure through an end effector while a set of other structures is connected (either directly or indirectly) to the first structure. Keystone robot 207 may be configured to engage and retain the first structure without any fixtures—e.g., none of the fixtures described above may be present in fixtureless assembly system 200. In some embodiments, structures to be retained by at least one of the robots (e.g., the first structure) may be additively manufactured or co-printed with one or more features that facilitate engagement and retention of those structures by the at least one of the robots without the use of any fixtures.

In retaining the first structure, keystone robot 207 may position (e.g., move) the first structure; that is, the position of the first structure may be controlled by keystone robot 207 when retained by the keystone robot. Keystone robot 207 may retain the first structure by holding or grasping the first structure, e.g., using an end effector of a robotic arm of the keystone robot. For example, keystone robot 207 may retain the first structure by causing gripper fingers, jaws, and the like to contact one or more surfaces of the first structure and apply sufficient pressure thereto such that the keystone robot controls the position of the first structure. That is, the first structure may be prevented from moving freely in space when retained by keystone robot 207, and movement of the first structure may be constrained by the keystone robot. As described above, the first structure may include one or more features that facilitates the fixtureless engagement and retention of the first structure by keystone robot 207.

As other structures (including subassemblies, substructures of structures, etc.) are connected to the first structure, keystone robot 207 may retain the engagement with the first structure through the end effector. The aggregate of the first structure and one or more structures connected thereto may be referred to as a structure itself, but may also be referred to as an assembly or a subassembly. Keystone robot 207 may retain an engagement with an assembly once the keystone robot has engaged the first structure.

In some embodiments, robots 209 and 211 of assembly cell 205 may be similar to keystone robot 207 and, thus, may include respective end effectors configured to engage with structures that may be connected with the first structure when retained by the keystone robot. In some embodiments, robots 209, 211 may be referred to as assembly robots and/or materials handling robots.

In some embodiments, robot 213 of assembly cell 205 may be used to affect a structural connection between the first structure and the second structure. For instance, robot 213 may be referred to as a structural adhesive robot. Structural adhesive robot 213 may be similar to the keystone robot 207, except the structural adhesive robot may include a tool at the distal end of the robotic arm that is configured to apply structural adhesive to at least one surface of structures fixturelessly retained by the keystone robot and structures fixturelessly retained by assembly robots 209, 211 before or after the structures are positioned at joining proximities with respect to other structures for joining with the other structures. The joining proximity can be a position that allows a first structure to be joined to a second structure. For example, in various embodiments, the first and second structures may be joined though the application of an adhesive while the structures are within the joining proximity and subsequent curing of the adhesive.

In various embodiments a quick-cure adhesive may be additionally applied to join the structures quickly and retain the structures so that the structural adhesive can cure without both robots holding the structures. In this regard, robot 215 of fixtureless assembly system 200 may be used to apply quick-cure adhesive and to cure the adhesive quickly. In this example embodiment, a quick-cure UV adhesive may be used, and robot 215 may be referred to as a UV robot. UV robot 215 may be similar to keystone robot 207, except the UV robot may include a tool at the distal end of the robotic arm that is configured to apply a quick-cure UV adhesive and to cure the adhesive, e.g., when the first structure is positioned within the joining proximity with respect to the second structure. That is, UV robot 215 may cure an adhesive after the adhesive is applied to the first structure and/or second structure when the structures are within the joining proximity obtained through direction of at least one of the robotic arms of keystone robot 207 and/or assembly robots 209, 211.

In various embodiments, a robot may be used for multiple different roles. For example, robot 217 may perform the role of an assembly robot, such as assembly robots 209, 211, and the role of a UV robot, such as UV robot 215. In this regard, robot 217 may be referred to as an "assembly/UV robot." Assembly/UV robot 217 may offer functionality similar to each of the assembly robots 109, 111 when the distal end of the robotic arm of the assembly/UV robot includes an end effector (e.g., connected by means of a tool flange). However, assembly/UV robot 217 may offer functionality similar to UV robot 215 when the distal end of the robotic arm of the assembly/UV robot includes a tool configured to applied UV adhesive and to emit UV light to cure the UV adhesive.

The quick-cure adhesive applied by UV robot 215 and assembly/UV robot 217 may provide a partial adhesive bond in that the adhesive may retain the relative positions of a first structure and a second structure within the joining proximity until the structural adhesive may be cured to permanently join the first structure and the second structure.

In assembling at least a portion of a vehicle in assembly cell 205, the second structure may be joined directly to the first structure by directing the various fixtureless robots 207, 209, 211, 213, 215, 217. Additional structures may be indirectly joined to the first structure. For example, the first structure may be directly joined to the second structure through movement(s) of keystone robot 207, structural adhesive robot 213, at least one assembly robot 209, 211, and/or UV robot 215. Thereafter, the first structure, joined with the second structure, may be indirectly joined to an additional structure as the additional structure is directly joined to the second structure. Thus, the first structure, which may continue to be retained by keystone robot 207, may evolve throughout an assembly process as additional structures are directly or indirectly joined to it.

In some embodiments, assembly robots 209, 211 may fixturelessly join two or more structures together, e.g., with a partial, quick-cure adhesive bond, before fixturelessly joining those two or more structures with the first structure retained by keystone robot 207. The two or more structures that are joined to one another prior to being joined with a structural assembly may also be a structure, and may further be referred to as a subassembly. Accordingly, when a structure forms a portion of a structural subassembly that is connected with the first structure through movements of keystone robot 107, structural adhesive robot 213, at least one assembly robot 209, 211, and UV robot 215, a structure of the structural subassembly may be indirectly connected to the first structure when the structural subassembly is joined to a structural assembly including the first structure.

In some embodiments, the structural adhesive may be applied, e.g., deposited in a groove of one of the structures, before the first and second structures are brought within the joining proximity. For example, structural adhesive robot 213 may include a dispenser for a structural adhesive and may apply the structural adhesive prior to the structures being brought within the joining proximity. In some embodiments, a structural adhesive may be applied after a structural assembly is fully constructed (that is, once each structure of the portion of the vehicle is joined to the first structure). For example, the structural adhesive may be applied to one or more joints or other connections between the first structure and the second structure. In some embodiments, the structural adhesive may be applied separately from fixtureless assembly system 200.

After the assembly is complete, i.e., all of the structures have been assembled, retained with a partial adhesive bond, with structural adhesive having been applied, the structural adhesive may be cured. Upon curing the structural adhesive, the portion of the vehicle may be completed and, therefore, may be suitable for use in the vehicle. For example, a completed structural assembly may meet any applicable industry and/or safety standards defined for consumer and/or commercial vehicles.

According to various embodiments, one or more of robots 207, 209, 211, 213, 215, 217 may be secured to a surface of assembly cell 205 through a respective base of each of the robots. For example, one or more of the robots may have a base that is bolted to the floor of the assembly cell. In various other embodiments, one or more of the robots may include or may be connected with a component configured to move the robot within assembly cell 205. For example, a carrier 219 in assembly cell 205 may be connected to assembly/UV robot 217.

Each of robots 207, 209, 211, 213, 215, 217 may include features that are common across all or some of the robots. For example, all of the robots may include a base, each of which having a surface (e.g., a bottom surface) that contacts assembly cell 205 (e.g., rests on or is secured to a floor of the assembly cell). Each base may have another surface (e.g., a top surface and/or a surface disposed on the base opposite from the surface contacting assembly cell 205) and, at a respective other surface, a base may connect with a proximal end of a respective robotic arm of a respective one of the robots.

In some embodiments, a base may be connected to the proximal end of a robotic arm through at least one rotation and/or translation mechanism. The at least one rotation and/or translation mechanism may provide at least one degree of freedom in movement of an end effector or other tool of the robotic arm. Correspondingly, the at least one rotation and/or translation mechanism may provide at least one degree of freedom in movement of a structure that is engaged and retained by an end effector or other tool of the robotic arm.

Each robotic arm of robots 207, 209, 211, 213, 215, 217 may include a distal end, oppositely disposed from the proximal end of the robotic arm. Each robotic arm of each of the robots may include an end effector and/or a tool, such as an adhesive application tool, curing tool, and so forth. An end effector or a tool may be at the distal end of a robotic arm. In some embodiments, the distal end of a robotic arm may be connected to an end effector or a tool (or tool flange) through at least one rotation and/or translation mechanism, which may provide at least one degree of freedom in movement of the tool and/or movement of a structure engaged and retained by the tool of the robotic arm.

In some embodiments, the distal end of a robotic arm may include a tool flange, and a tool included at the tool flange; for example, a tool may be connected to the distal end of a robotic arm by means of the tool flange. A tool flange may be configured to include a plurality of tools. In this way, for example, the assembly/UV robot 217 may offer functionality similar to each of the assembly robots 209, 211 when a distal end of a robotic arm of the assembly/UV robot 217 includes an end effector (e.g., connected by means of the tool flange). In addition, the assembly/UV robot 217 may offer functionality similar to the UV robot 215 when the distal end of the robotic arm of the assembly/UV robot 217 includes a tool configured to apply UV adhesive and to emit UV light to cure the adhesive.

According to some embodiments, a tool flange and/or tool may provide one or more additional degrees of freedom for rotation and/or translation of a structure engaged and retained by the tool. Such additional degrees of freedom may supplement the one or more degrees of freedom provided through one or more mechanisms connecting a base to the proximal end of a robotic arm and/or connecting the distal end of a robotic arm to the tool (or tool flange). Illustratively, a robotic arm of at least one of robots 207, 209, 211, 213, 215, 217 may include at least one joint configured for rotation and/or translation at a distal and/or proximal end, such as an articulating joint, a ball joint, and/or other similar joint.

One or more of the respective connections of robots 207, 209, 211, 213, 215, 217 (e.g., one or more rotational and/or translational mechanisms connecting various components of one of the robots), a respective tool flange, and/or a respective tool may provide at least a portion (and potentially all) of six degrees of freedom (6DoF) for a structure engaged and retained by the robots. The 6DoF may include forward/backward (e.g., surge), up/down (e.g., heave), left/right (e.g., sway) for translation in space and may further include yaw, pitch, and roll for rotation in space. Access to various portions of a structure may be attainable through one or more of the 6DoF, as opposed to retention of a structure using a fixture, which cannot offer 6DoF in movement of a structure and also blocks access to a significant portion of a structure attached thereto.

Each of the robots 207, 209, 211, 213, 215, 217 may be communicatively connected with a controller, such as a respective one of controllers 237, 239, 241, 243, 245, 247 shown in FIG. 2. Each of controllers 237, 239, 241, 243, 245, 247 may include, for example, a memory and a processor communicatively connected to the memory, and may be similar to the computer 150 and memory 154 as described with respect to FIG. 1. According to some other embodiments, one or more of controllers 237, 239, 241, 243, 245, 247 may be implemented as a single controller that is communicatively connected to one or more of the robots controlled by the single controller.

Computer-readable instructions for performing fixtureless assembly can be stored on the memories of controllers 237, 239, 241, 243, 245, 247, and the processors of the controllers can execute the instructions to cause robots 207, 209, 211, 213, 215, 217 to perform various fixtureless operations, such as those described above.

Controllers 237, 239, 241, 243, 245, 247 may be communicatively connected to one or more components of an associated robot 207, 209, 211, 213, 215, or 217, for example, via a wired (e.g., bus or other interconnect) and/or wireless (e.g., wireless local area network, wireless intranet) connection. Each of the controllers may issue commands, requests, etc., to one or more components of the associated robot, for example, in order to perform various fixtureless operations.

According to some embodiments, controllers 237, 239, 241, 243, 245, 247 may issue commands, etc., to a robotic arm of the associated robot 207, 209, 211, 213, 215, or 217 and, for example, may direct the robotic arms based on a set of absolute coordinates relative to a global cell reference frame of assembly cell 205. In various embodiments, controllers 237, 239, 241, 243, 245, 247 may issue commands, etc., to tools connected to the distal ends of the robotic arms. For example, the controllers may control operations of the tool, including depositing a controlled amount of adhesive on a surface of the first structure or second structure by an adhesive applicator, exposing adhesive deposited between structures to UV light for a controlled duration by a curing tool, and so forth. In various embodiments, controllers 237, 239, 241, 243, 245, 247 may issue commands, etc., to end effectors at the distal ends of the robotic arms. For example, the controllers may control operations of the end effectors, including, engaging, retaining, and/or manipulating a structure.

According to various other aspects, a computing system, such as computing system 229, similarly having a processor and memory, may be communicatively connected with one or more of controllers 237, 239, 241, 243, 245, 247. In various embodiments, the computing system may be communicatively connected with the controllers via a wired and/or wireless connection, such as a local area network, an intranet, a wide area network, and so forth. In some embodiments, the computing system may be implemented in one or more of controllers 237, 239, 241, 243, 245, 247. In some other embodiments, the computing system may be located outside assembly cell 205.

The processor of the computing system may execute instructions loaded from memory, and the execution of the instructions may cause the computing system to issue commands, etc., to the controllers 237, 239, 241, 243, 245, 247, such as by transmitting a message including the command, etc., to one of the controllers over a network connection or other communication link.

According to some embodiments, one or more of the commands may indicate a set of coordinates and may indicate an action to be performed by one of robots 207, 209, 211, 213, 215, 217 associated with the one of the controllers that receives the command. Examples of actions that may be indicated by commands include directing movement of a robotic arm, operating a tool, engaging a structure by an end effector, rotating and/or translating a structure, and so forth. For example, a command issued by a computing system may cause controller 239 of assembly robot 209 to direct a robotic arm of assembly robot 209 so that the distal end of the robotic arm may be located based on a set of coordinates that is indicated by the command.

The instructions loaded from memory and executed by the processor of the computing system, which cause the controllers to control actions of the robots may be based on computer-aided design (CAD) data. For example, a CAD model of assembly cell 205 (e.g., including CAD models of the physical robots) may be constructed and used to generate the commands issued by the computing system.

Accordingly, in one example of a fixtureless assembly process, multiple robots (e.g., robots 207, 209, 211, 213, 215, and/or 17) are controlled (e.g., by computing system 229 and/or one or more controller(s) 237, 239, 241, 243, 245, 247) to join two structures together within an assembly cell (e.g. a vertical assembly cell such as assembly cell 205). The assembly operations may be performed repeatedly so that multiple structures may be joined for fixtureless assembly of at least a portion of a vehicle (e.g., vehicle chassis, body, panel, and the like). A first material handling robot (e.g., robot 209) may retain (e.g., using an end effector) a first structure (e.g., first structure 223) that is to be joined with a second structure (e.g., second structure 225) similarly retained by a second material handling robot (e.g., robot 211). A structural adhesive dispensing robot (e.g., robot 213) may apply structural adhesive to a surface of the first structure retained by the first robot. The first material handling robot may then position the first structure at a joining proximity with respect to the second structure retained by the second material handling robot. A metrology system (e.g., metrology system 231) may implement a move-measure-correct (MMC) procedure to accurately measure, correct, and move the robotic arms of the robots and/or the structures held by the robots into optimal positions at the joining proximity (e.g. using laser scanning and/or tracking).

The positioned structures (e.g., structures 223, 225) may then be joined together using the structural adhesive and cured (e.g., over time or using heat). However, as the curing rate of the structural adhesive may be relatively long, a quick-cure adhesive robot (e.g., robot 215 or robot 217) additionally applies a quick-cure adhesive to the first and/or second structures when the first and second structures are within the joining proximity, and then the quick-cure adhesive robot switches to an end-effector which emits electromagnetic (EM) radiation (e.g., ultraviolet (UV) radiation) onto the quick-cure adhesive. For example, the quick-cure adhesive robot may apply UV adhesive strips across the surfaces of the first and/or second structures such that the UV adhesive contacts both structures, and then the robot may emit UV radiation onto the UV adhesive strips. Upon exposure to the EM radiation, the quick-cure adhesive cures at a faster curing rate than the curing rate of the structural adhesive, thus allowing the first and second structure to be retained in their relative positions without fixtures so that the robots may quickly attend to other tasks (e.g., retaining and joining other parts) without waiting for the structural adhesive to cure. Once the structural adhesive cures, the first and second structures are bonded with structural integrity.

However, as the first and second structures in the joining proximity may be oriented in a variety of positions, the UV adhesive strips contacting the surface(s) may occasionally move (e.g., drip off). For instance, one structure may be positioned upside-down relative to another structure, and the UV adhesive may therefore drip off due to gravity. As a result, when the UV adhesive is cured, the first and second structures may be inadvertently retained in positions that do not provide acceptable tolerance, impacting the structural integrity of the assembly.

Difficulties in applying UV adhesive at the joining proximity may also cause improper retention of structures. For example, the material handling robots retaining the first and second structures in the joining proximity may be tightly packed in the assembly cell. As a result, a quick-cure adhesive robot may have difficulty maneuvering around the material handling robots and applying the UV adhesive to the structures in the joining proximity within this tightly packed area. Moreover, since the metrology system may also be using laser tracking to perform MMC for these structures in this tightly packed area, the quick-cure adhesive robot may potentially obstruct the lasers and the MMC process when attempting to apply the UV adhesive. As a result, the entire assembly may be impacted. For instance, when assemblies are formed by stacking different parts, the misalignment of one structure may affect the alignment of other parts which the structure supports. Additionally, since structures and subassemblies are frequently moved during the assembly process, an improper retention may cause the structures or subassemblies to deflect or drop from the assembly.

Joint Assembly and Disassembly

Figure 3:
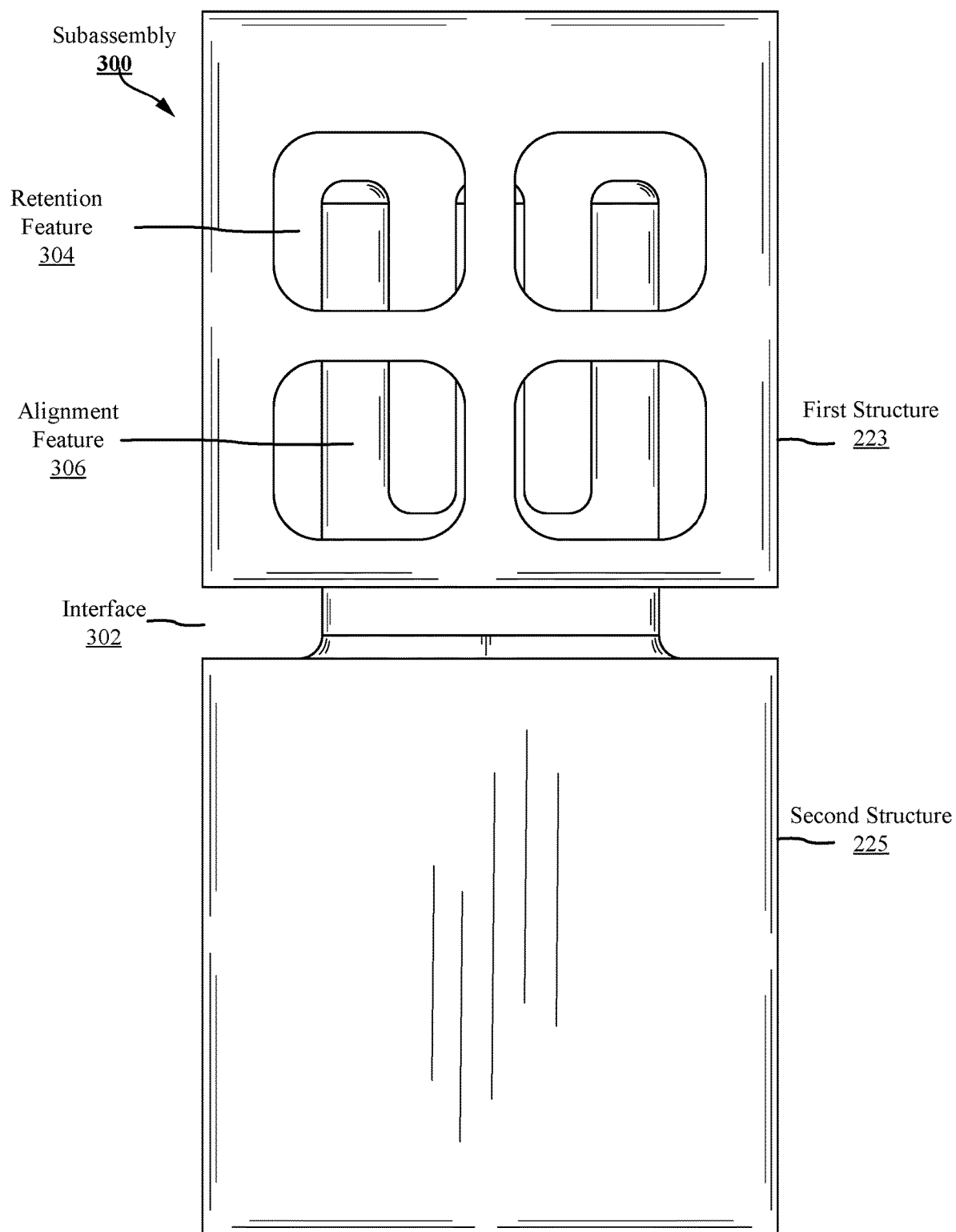
FIG. 3 illustrates a connection at a retention feature between structures in accordance with an aspect of the present disclosure.

FIG. 3 illustrates a connection at a retention feature between structures in accordance with an aspect of the present disclosure.

As shown in FIG. 3, a subassembly 300 may include multiple structures, e.g., first structure 223 and second structure 225. Where first structure 223 and second structure 225 join, e.g., at interface 302, first structure 223 may have a retention feature 304 while second structure 225 may have an alignment feature 306 that is coupled to retention feature 304.

The retention feature 304 may serve multiple functions, e.g., a visual assurance that first structure 223 and second structure 225 are coupled together, alignment of the first structure 223 and second structure 225, etc. Further, retention feature 304 may serve as an insertion point for an adhesive to bond first structure 223 and second structure 225 together.

When first structure 223 and second structure 225 are coupled together, an adhesive, such as a quick-cure adhesive, may be placed in alignment feature 223, while a second adhesive, such as a structural adhesive, may be placed elsewhere between first structure 223 and second structure 225. The quick-cure adhesive may provide a quick connection for the subassembly 300 during other assembly operations, such that subassembly can be handled and moved as a single piece for other assembly operations.

Moreover, FIG. 3 illustrates an example of a subassembly 300 including a first structure 223 joined to a second structure 225 using the retention feature 304 and alignment feature 306.

First structure 223 of subassembly 300 may have an adhesive dispensing robot (e.g., robot 213, 215, or 217) inject a quick-cure adhesive into retention feature 304. After the adhesive is dispensed into retention feature 304, the first structure 223 may also be exposed to EM radiation, e.g., ultraviolet (UV) light, to cure the quick-cure adhesive contained within the retention feature 304. Second structure 225 of subassembly 300 may include an alignment feature 306, which may be referred to as a tongue, which a material handling robot (e.g., robot 209 or 211) may place into the quick-cure adhesive within the retention feature 304 of the first structure 223. The tongue may include a plurality of segments spaced apart from each other (e.g., comb shape shown in FIG. 3), a plurality of openings (e.g., a waffle or grid shape) or may be a solid tongue which contacts the quick-cure adhesive when the alignment feature 306 (tongue) is inserted into the retention feature 304.

Figure 4:
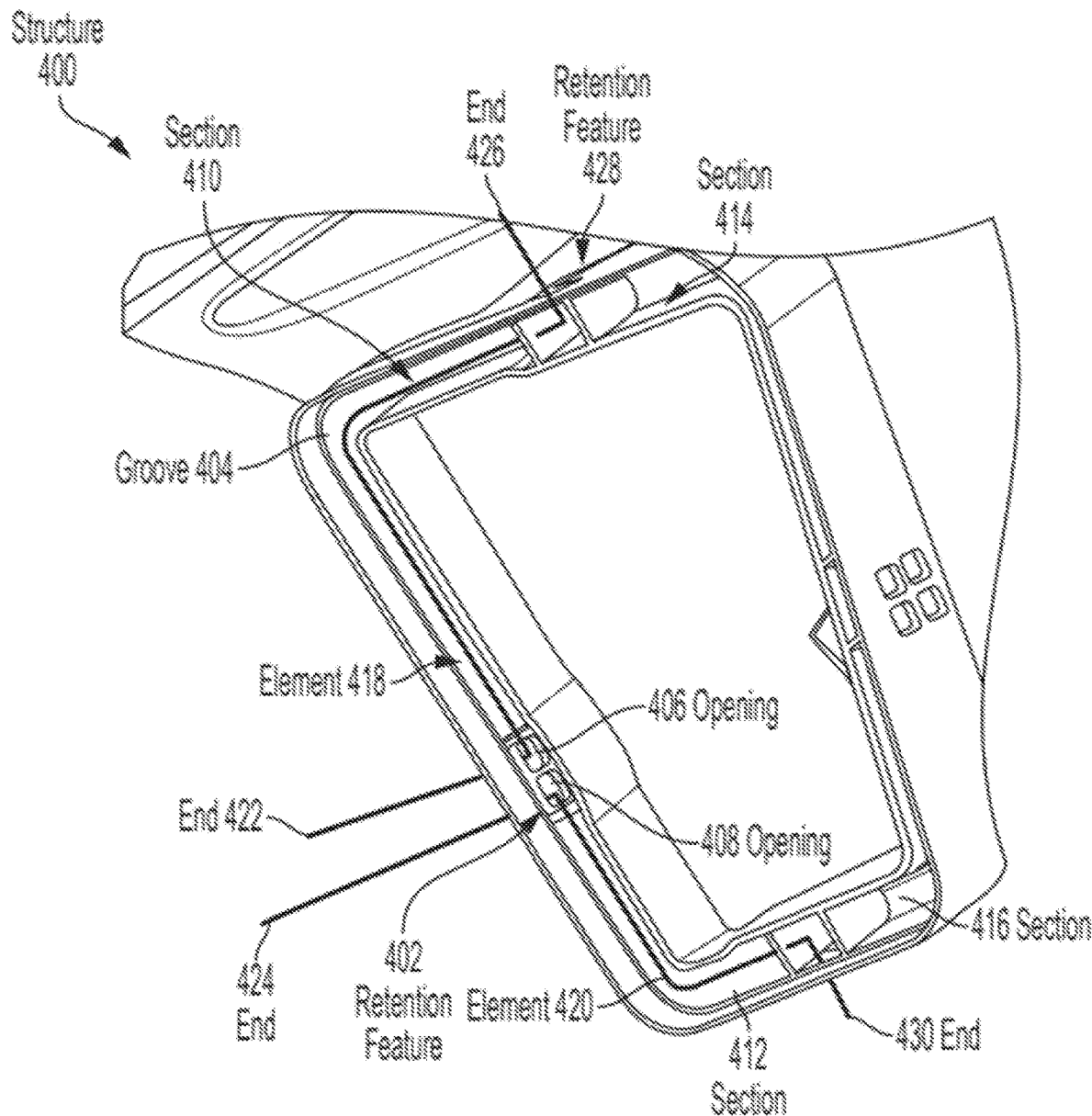
FIG. 4 illustrates a perspective view of a groove feature in accordance with an aspect of the present disclosure.

FIG. 4 illustrates a perspective view of a groove feature in accordance with an aspect of the present disclosure.

FIG. 4 illustrates a structure 400, with a retention feature 402 and groove 404. Retention feature 402 may comprise one or more openings 406-408, and groove 404 may comprise one or more sections 410-416, depending on the design of structure 400. Structure 400 may be an AM structure, and structure 400 may be coupled to other structures, or other AM structures, in an aspect of the present disclosure.

In an aspect of the present disclosure, one or more elements 418-420, which may be thermal elements, may be placed in groove 404 and coupled to retention feature 402. For example, and not by way of limitation, element 414 may be placed in groove section 410 and an end 422 of element 418 may be accessible through opening 406, while another element 420 may be placed in groove section 412 and an end 424 of element 420 may be accessible through opening 408.

The opposite end 426 of element 418 may be accessed through another retention feature 402, or may be coupled elsewhere, such that an electrical connection may be made to ends 422, 428 of element 418. Similarly, the opposite end 430 of element 420 may be access through another retention feature or may be coupled elsewhere such that a separate electrical connection may be made to ends 424, 430 of element 420.

As described in FIG. 4, structure 400 may have a plurality of sections of groove 404, e.g., sections 410-414, etc., that may comprise a first adhesive interface for the structure 400. Structure 400 may couple to another structure, as shown in FIGS. 3, 5, 6, and 7, which has a corresponding interface (tongue) that mates to sections 410-414. Adhesive, such as a structural adhesive, is placed in one or more sections 410-414 at the "joint" between structure 400 and the mating structure to structure 400. This joint is where structure 400 is joined to other structures within an assembly.

Further, the elements 418 and 420, which may be thermal elements, are placed in the joint and are coupled to the adhesive in the sections 410-414, such that elements 418 and 420 can selectively provide energy to the sections 410-414 of the joint and the associated adhesive from an external source. This application of energy softens or weakens the adhesive in the joint to allow for structure 400 to be removed from the mating structure.

Figure 6:
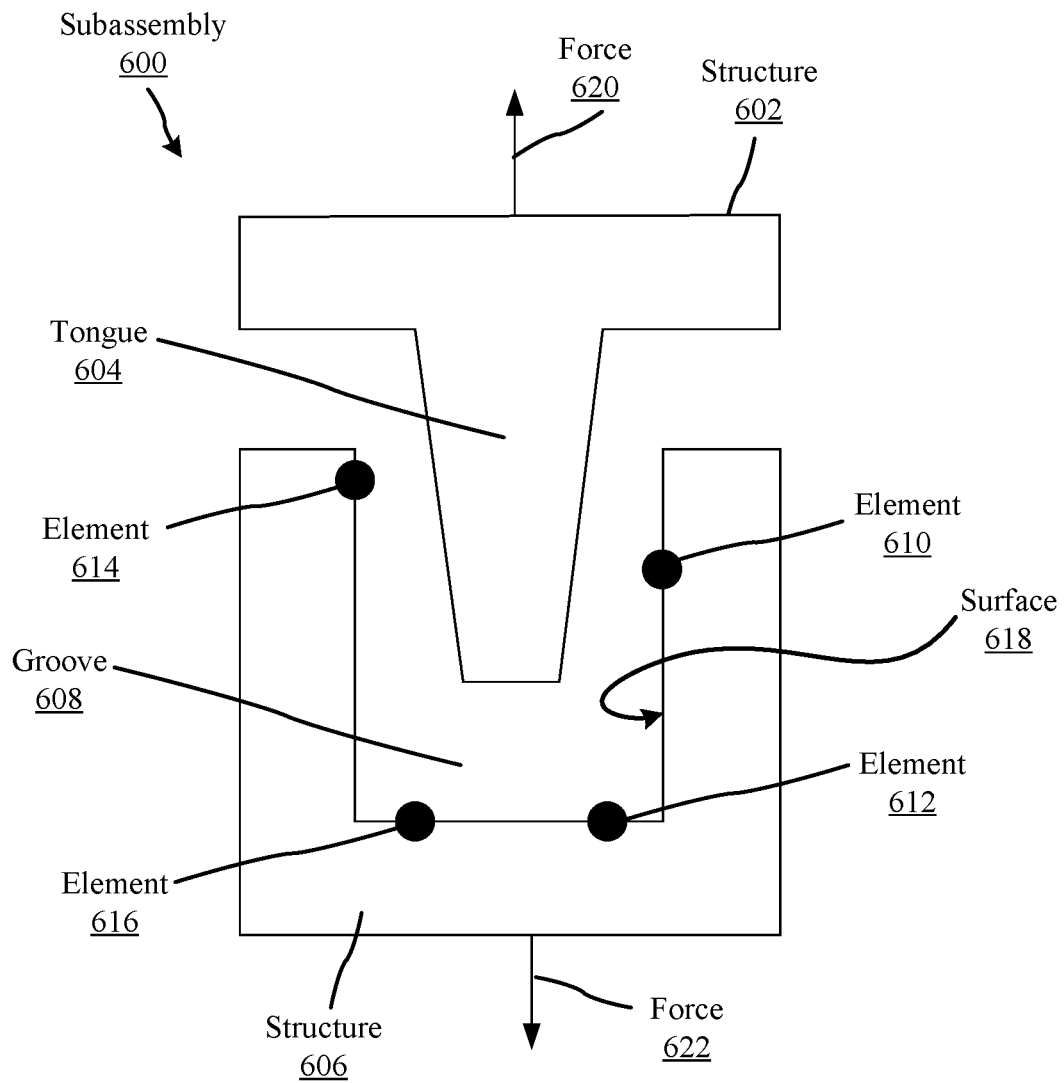
FIG. 6 illustrates a cross-sectional view of a tongue and groove connection in accordance with an aspect of the present disclosure.

The energy supplied may be a thermal or electrical energy, and, as shown in FIG. 4, there can be more than one element 418-420 in a given joint. Further, as shown in FIG. 6, each section 410-414 can have a plurality of elements in each section, which may expedite or otherwise ease disassembly of structure 400 from mating structures.

The adhesive interface may be of any shape, but, as shown in FIGS. 3-7, may be of a tongue shape or a groove shape. Further, each tongue and/or groove may comprise a plurality of sections as shown in FIG. 3. Each section of the tongue/groove may have an associated element 410-414 embedded in that particular section, and, as shown in FIG. 3, one or more of the elements may be accessible through one or more "windows" or "pathways" of the retention feature of structure 400. The elements 418-420 can be any thermal, electromagnetic, or electrical conductor, such as a wire or conductive trace in the groove/tongue or other thermal, electrical, or electromagnetic pathway.

Figure 5:
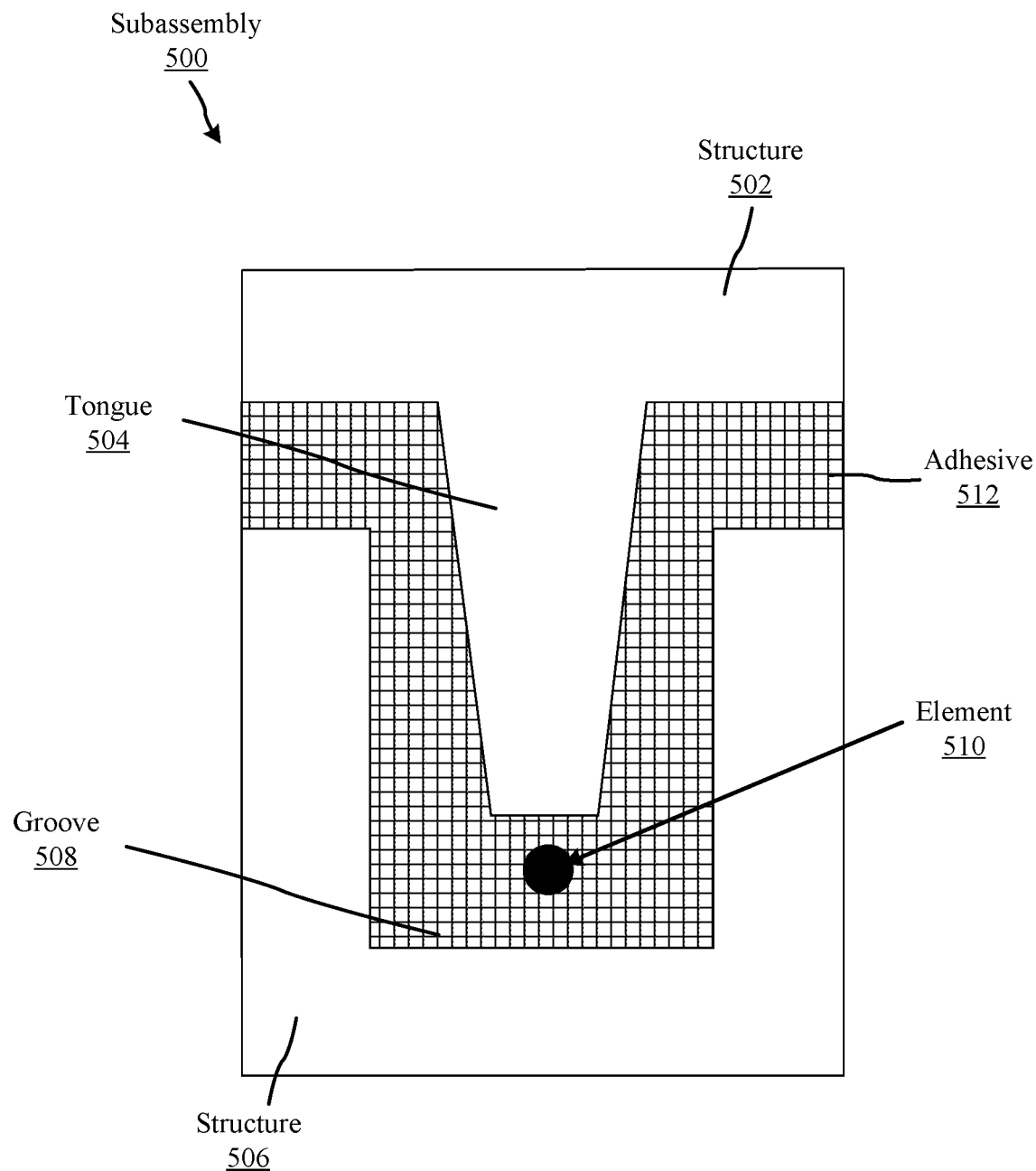
FIG. 5 illustrates a cross-sectional view of a tongue and groove connection in accordance with an aspect of the present disclosure.

FIG. 5 illustrates a cross-sectional view of a tongue and groove connection in accordance with an aspect of the present disclosure.

FIG. 5 illustrates a subassembly 500, including structure 502 having a tongue 504 coupled to a structure 506 having a groove 508, with element 510 between structure 502 and structure 506. Structure 502 and structure 506 are coupled with adhesive 512. Element 510 may be placed in one or more grooves 508 of the adhesive sections of structure 502 and structure 506 to facilitate the disassembly of bonded subassembly 500. Element 510, which may be similar to elements 418 and 420 described in FIG. 4, may allow for the softening or reduction of bonding strength of adhesive 512, through the application of heat or other energy to adhesive 512. Once the adhesive 512 is sufficiently softened, the structures 502 and 506 can be disassembled without any machining of the structures 502 and 506, and may also reduce unwanted thermal impacts on the structures 502 and 506. In an aspect of the present disclosure, element 510 can be placed in the joint sections, e.g., groove 508 of structure 506, prior to adhesive 512 application.

In an aspect of the present disclosure, and as described with respect to FIG. 4, ends of element 510 may be accessed, either through retention features or in other ways, to provide energy to element 510. Such energy may be electrical energy, thermal energy, and/or other forms of energy, such that the energy applied to element 510 reduces the bonding strength of adhesive 512. After a period of time during which the energy is applied to element 510, the bond between structure 502 and structure 506 provided by adhesive 512 may be weakened enough such that structure 502 and structure 506 may be separated without significant damage to structure 502 and/or structure 506.

In an aspect of the present disclosure, application of energy to element 510 may allow for the disassembly of subassembly 500 into one or more component parts, e.g. structure 502 and structure 506, such that repair or replacement of a portion of the subassembly 500 may be undertaken. For example, and not by way of limitation, one of structure 502 and structure 506 may be damaged, e.g., through accident, wear and tear, etc. Rather than replacing all of subassembly 500, application of energy through element 510 may allow for removal and replacement of the damaged portion of subassembly 500, which may reduce repair costs.

FIG. 6 illustrates a cross-sectional view of a tongue and groove connection in accordance with an aspect of the present disclosure.

FIG. 6 illustrates subassembly 600, which includes structure 602 having tongue 604 and structure 606 having groove 608. Elements 610-616 may be located within groove 608, and may be located anywhere along surface 618, or one or more elements 610-616 may be positioned between tongue 604 and surface 618 as element 510 is illustrated in FIG. 5.

In order to apply additional energy density to the volume between structure 602 and structure 606, a plurality of elements 610-616 may be placed in between tongue 604 and structure 606, e.g., within the connection volume to be filled with adhesive between structure 602 and structure 606. Applying energy, e.g., electrical energy, thermal energy, ultrasonic energy, etc. to elements 610-616 may allow for easier separation of structure 602 and structure 606. Further, some structures 602 and 606 may benefit from a plurality of elements 610-616 being placed in a given groove 608.

Figure 7:
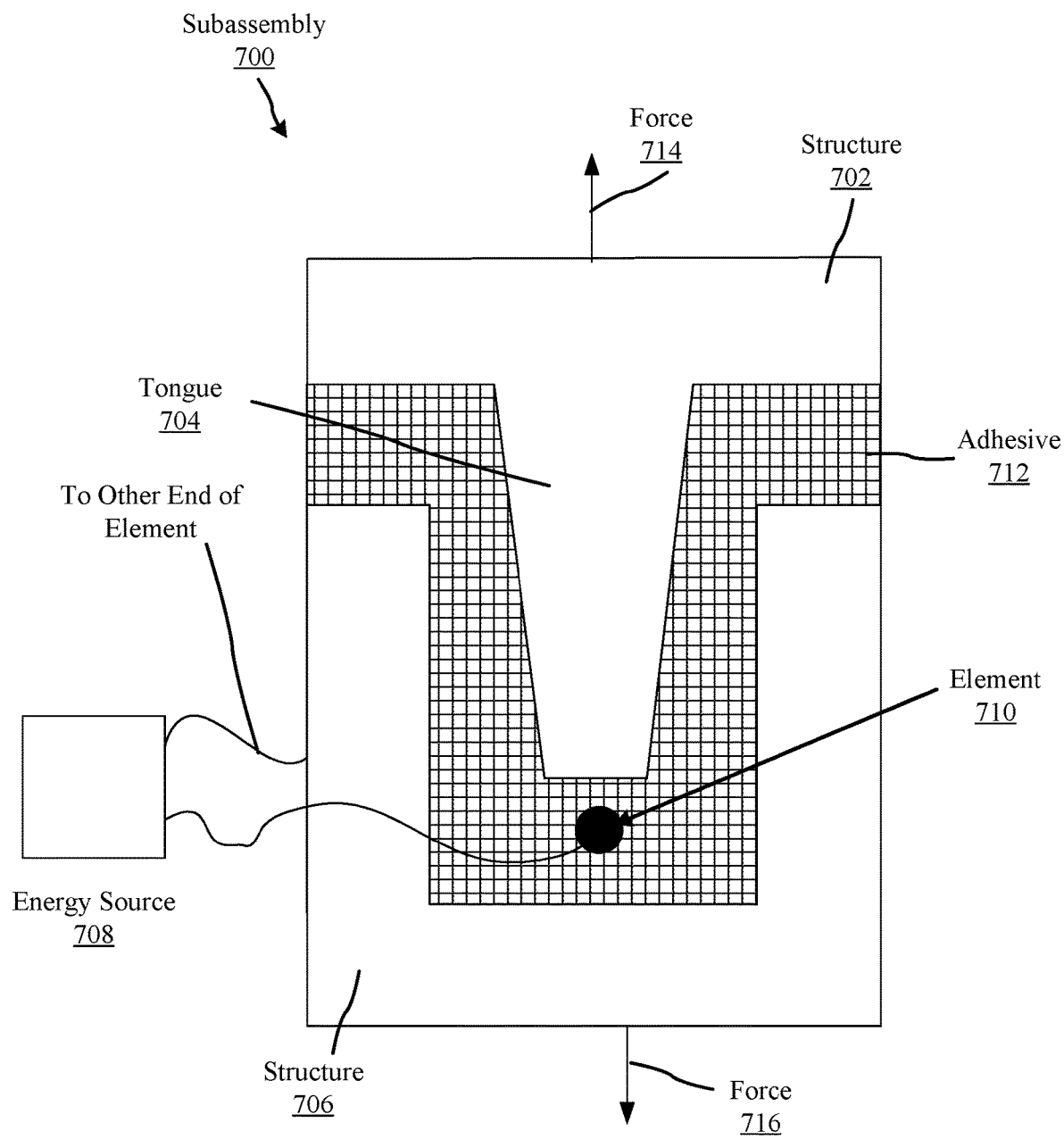
FIG. 7 illustrates separating a subassembly into multiple structures in accordance with an aspect of the present disclosure.

FIG. 7 illustrates separating a subassembly into multiple structures in accordance with an aspect of the present disclosure.

FIG. 7 illustrates a subassembly 700, which may be similar to subassembly 500 or subassembly 600 shown in FIGS. 5 and 6. Subassembly 700 includes structure 702 with tongue 704, structure 706, and an energy source 708 coupled to element 710 that is within adhesive 712.

To separate structures, e.g., structure 702 from structure 706, after the structures have been bonded together with adhesive 712, electrical, thermal, or other energy is applied by energy source 708 to element 710 to softens or otherwise reduce the adhesive strength of the adhesive 712. One or more forces 714 and 716, such as pulling or shifting forces, can be applied to e.g., structure 702 and structure 706 to separate the subassembly 700 into separate pieces, namely structure 702 and structure 706.

For example, and not by way of limitation, structure 706 may be clamped or held onto a bench or table while energy is being applied from energy source 708 to element 710. Once a sufficient amount of energy is applied to adhesive 712 to soften or sufficiently reduce the adhesive strength of adhesive 712, force 714, such as a mechanical pulling force, may be applied to structure 702 to separate structure 702 from structure 706.

Figure 8:
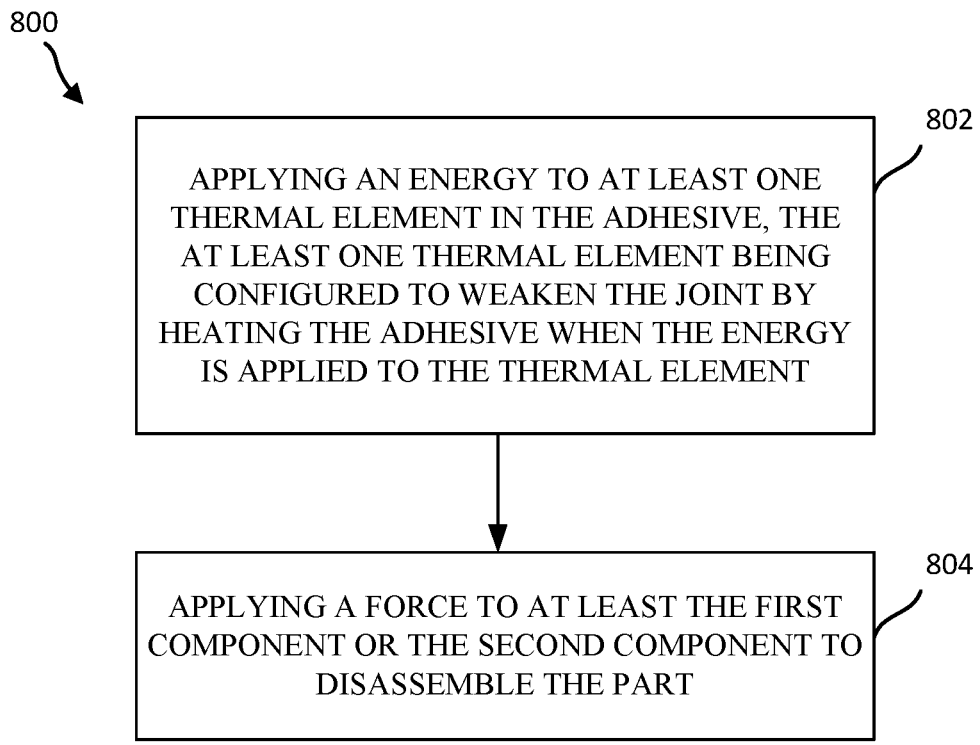
FIG. 8 illustrates a process for disassembling adhesively-bonded components in accordance with an aspect of the present disclosure.

FIG. 8 illustrates a process for disassembling adhesively-bonded components in accordance with an aspect of the present disclosure.

Process 800 includes block 802, which illustrates applying an energy to at least one thermal element in the adhesive, the at least one thermal element being configured to weaken the joint by heating the adhesive when the energy is applied to the thermal element. Block 802 is illustrated at least by the application of energy from energy source 708 as shown in FIG. 7.

Block 804 illustrates applying a force to at least the first component or the second component to disassemble the part. Block 804 is illustrated at least by forces 712 or 714 described with respect to FIG. 4.

Advantages of the Present Disclosure

In an aspect of the disclosure, the disclosure provides a method for disassembling adhesively-bonded node structures after the adhesive has cured.

In an aspect of the present disclosure, the disclosure provides a method for disassembling structures without machining of one or more of the structures being disassembled.

In an aspect of the present disclosure, the disclosure provides a method for disassembling structures with a reduced thermal input that may be detrimental to the structures, such as a global heating of the subassembly which may weaken other bonded structures.

In an aspect of the present disclosure, the disclosure provides a method for disassembling structures that enhances the serviceability of node-based structures by reducing scrap during servicing and repair which may allow for re-use of un-damaged parts.

One skilled in the art will appreciate that the joint structure described with respect to FIGS. 3-6 are simply illustrative examples of a structure that joins a first component with a second component and that variations to the components and techniques described may be used without departing from the scope of the present disclosure.

The previous description is provided to enable any person skilled in the art to practice the various aspects described herein. Various modifications to these exemplary embodiments presented throughout this disclosure will be readily apparent to those skilled in the art, and the concepts disclosed herein may be applied to other techniques for printing nodes and interconnects. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An apparatus, comprising:
a first component including a first adhesive interface;
a second component including a second adhesive interface;
a joint between the first and second adhesive interfaces, the joint comprising an adhesive bonding to the first adhesive interface and to the second adhesive interface, such that the first component and the second component are joined together;
a plurality of thermal elements in the adhesive, wherein the plurality of thermal elements is configured to weaken the joint by heating the adhesive when an energy is applied to the plurality of thermal elements;
the second component comprising a retention feature configured to hold the first and second components together during a curing of the adhesive, wherein the retention feature comprises a plurality of pathways, and wherein each thermal element of the plurality of thermal elements is accessed through one of the pathways of the plurality of pathways; and
the first component comprising an alignment feature, wherein the alignment feature is configured to be coupled to the retention feature.

2. The apparatus of claim 1, wherein the energy comprises at least a thermal energy or an electrical energy.

3. The apparatus of claim 1, wherein the first adhesive interface comprises a tongue, and the second adhesive interface comprises a groove.

4. The apparatus of claim 3, wherein the groove of the second component comprises a plurality of sections, and at least one thermal element of the plurality of thermal elements is in a section of the plurality of sections of the groove of the second component.

5. The apparatus of claim 1, wherein each thermal element of the plurality of thermal elements is coupled to more than one pathway of the plurality of pathways.

6. The apparatus of claim 1, wherein at least one of the plurality of thermal elements includes a wire.

7. The apparatus of claim 1, wherein the alignment feature comprises a tongue or a plurality of segments spaced apart.

* * * * *